(12) United States Patent
Wang et al.

(10) Patent No.: US 12,482,406 B2
(45) Date of Patent: Nov. 25, 2025

(54) DISPLAY PANEL AND DISPLAY DEVICE

(71) Applicant: WUHAN TIANMA MICRO-ELECTRONICS CO., LTD., Wuhan (CN)

(72) Inventors: Cong Wang, Wuhan (CN); Wenxin Jiang, Wuhan (CN); Feng Qin, Wuhan (CN)

(73) Assignee: WuHan TianMa Micro-electronics Co., Ltd., Wuhan (CN)

( * ) Notice: Subject to any disclaimer, the term of this patent is extended or adjusted under 35 U.S.C. 154(b) by 196 days.

(21) Appl. No.: 18/163,970

(22) Filed: Feb. 3, 2023

(65) Prior Publication Data

US 2023/0186843 A1 Jun. 15, 2023

(30) Foreign Application Priority Data

Aug. 29, 2022 (CN) .......................... 202211039844.8

(51) Int. Cl.
*G09G 3/32* (2016.01)
*G11C 19/28* (2006.01)

(52) U.S. Cl.
CPC ............... *G09G 3/32* (2013.01); *G11C 19/28* (2013.01); *G09G 2310/0267* (2013.01); *G09G 2310/0286* (2013.01)

(58) Field of Classification Search
CPC ............. G09G 3/32; G09G 2310/0267; G09G 2310/0286; G11C 19/28
See application file for complete search history.

(56) References Cited

U.S. PATENT DOCUMENTS

| 10,636,505 | B2 * | 4/2020 | Dun | H01L 27/1225 |
| 10,762,821 | B1 * | 9/2020 | Luo | H01L 27/0266 |
| 10,762,852 | B2 * | 9/2020 | Jung | G09G 3/3233 |
| 11,176,892 | B2 * | 11/2021 | Jung | G09G 3/3291 |
| 11,710,457 | B2 * | 7/2023 | Jung | G09G 3/3233 |
| | | | | 345/76 |
| 2015/0035733 | A1 * | 2/2015 | Woo | G09G 3/3266 |
| | | | | 345/76 |
| 2019/0304558 | A1 * | 10/2019 | Dun | G02F 1/136286 |
| 2019/0318693 | A1 * | 10/2019 | Jung | G09G 3/3266 |
| 2020/0394963 | A1 * | 12/2020 | Jung | H10K 59/131 |
| 2021/0376038 | A1 * | 12/2021 | Won | H10K 77/111 |

(Continued)

FOREIGN PATENT DOCUMENTS

| CN | 107819009 A | 3/2018 |
| CN | 107992229 A | 5/2018 |
| CN | 108573671 A | 9/2018 |

(Continued)

OTHER PUBLICATIONS

Machine translation of CN 107992229 (Year: 2025).*

(Continued)

*Primary Examiner* — Michael Pervan
(74) *Attorney, Agent, or Firm* — CHRISTENSEN O'CONNOR JOHNSON KINDNESS PLLC

(57) ABSTRACT

Provide are a display panel and a display device. The display panel includes a driving circuit arranged in a non-display area of the display panel and includes shift registers that are cascaded, driving signal lines configured to provide signals to the driving circuit, and at least one first signal line located in a display area of the display panel.

18 Claims, 20 Drawing Sheets

(56) References Cited

U.S. PATENT DOCUMENTS

2022/0068215 A1* 3/2022 Jung .................... G09G 3/3266

FOREIGN PATENT DOCUMENTS

| CN | 108711575 A | 10/2018 |
| CN | 109087608 A | 12/2018 |
| CN | 113764478 A | 12/2021 |

OTHER PUBLICATIONS

Notice of First Examination Opinion mailed Oct. 29, 2024, issued in corresponding International Application No. 202211039844.8, filed Aug. 29, 2022, 16 pages.

* cited by examiner

DISPLAY PANEL AND DISPLAY DEVICE

CROSS-REFERENCE TO RELATED APPLICATIONS

The present disclosure claims priority to Chinese Patent Application No. 202211039844.8 filed on Aug. 29, 2022, the content of which is incorporated herein by reference in its entirety.

TECHNICAL FIELD

The present disclosure relates to the field of display technology, and in particular, to a display panel and a display device.

BACKGROUND

With the application of display technology in smart wearable and other portable electronic devices, the design of electronic products is constantly pursuing a smooth user experience. At the same time, users are increasingly pursuing sensory experience. For example, wide viewing angle, high resolution, narrow frame, and high screen ratio have become the selling points of various electronic products. A driving circuit and a driving signal line are provided in a frame area of the display panel, resulting in a large width of the frame and thus limited narrowing design of the frame. The narrowing design of the frame has become one of the key issues studied by major manufacturers.

SUMMARY

The present disclosure provides a display panel and a display device.

In a first aspect, an embodiment of the present disclosure provides a display panel. The display panel has a display area and a non-display area and includes: a driving circuit arranged in a non-display area of the display panel and including shift registers that are cascaded; and driving signal lines configured to provide signals to the driving circuit and including at least one first signal line located in a display area of the display panel.

In a second aspect, an embodiment of the present disclosure provides another display panel. The display panel includes: a driving circuit located in a non-display area of the display panel; and pixel circuits located in a display area of the display panel. The pixel circuits are arranged to form pixel circuit rows, and one pixel circuit row of the pixel circuit rows includes multiple pixel circuits arranged in a first direction; the pixel circuit rows include a first pixel circuit row and a second pixel circuit row; in a second direction, the first pixel circuit row and the second pixel circuit row are misaligned at an end adjacent to the non-display area; and the second direction intersects with the first direction. The driving circuit includes shift registers that are cascaded, and the shift registers include a fifth shift register and a sixth shift register. In the first direction, the fifth shift register is adjacent to the first pixel circuit row, and the sixth shift register is adjacent to the second pixel circuit row; and in the second direction, the fifth shift register and the sixth shift register are misaligned at an end adjacent to the display area.

In a third aspect, an embodiment of the present disclosure provides a display device, including the display panel described in any one of the embodiments of the present disclosure.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, other drawings can also be acquired by those skilled in the art without paying creative efforts.

DESCRIPTION OF EMBODIMENTS

In order to make the purpose, technical solutions, and advantages of the embodiments of the present disclosure be understandable, the technical solutions in the embodiments of the present disclosure are described in the following with reference to the accompanying drawings. It should be understood that the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

Figure 1:
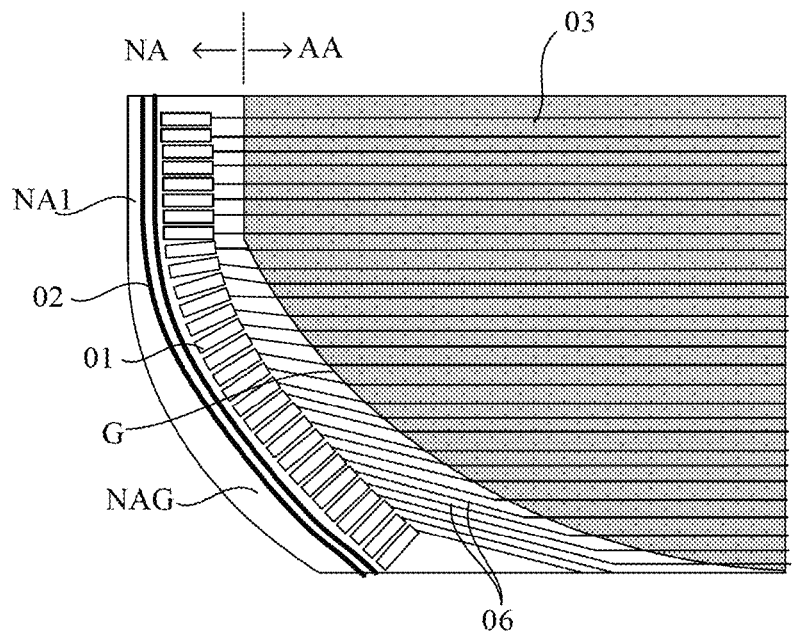
FIG. 1 is a partial schematic diagram of a display panel in the related art.

FIG. 1 is a partial schematic diagram of a display panel in the related art. As shown in FIG. 1, shift registers 01 that are cascaded and driving signal lines 02 (only two driving signal lines 02 are shown in FIG. 1) for driving the shift registers are provided in a non-display area NA of the display panel. An output terminal of the shift transistor 01 is connected to a gating line 03 provided in the display area AA. The display area AA is provided with pixel circuits (not shown in FIG. 1), and one gating line 03 is coupled to more than one pixel circuit. The shift registers 01 and the driving signal lines 02 arranged in the non-display area NA occupy a relatively large space, which affects the narrowing design of the non-display area NA.

In addition, as shown in FIG. 1, the display area AA has a profiled corner G; and the non-display area NA includes a corner non-display area NAG adjacent to the profiled corner G, and a straight-edge non-display area NA1 connected to the corner non-display area NAG. In order to ensure the corresponding connection between the shift register 01 and the driving signal line 02 in the corner non-display area NAG, and to ensure that the overall space occupied by the shift registers 01 and the driving signal lines 02 in the corner non-display area NAG is small, the shift registers 01 in the display area NAG needs to be obliquely arranged. That is, the shift registers 01 are arranged along a contour shape of the profiled corner G, and the driving signal lines 02 each extend along outer edges of the shift registers 01.

Figure 2:
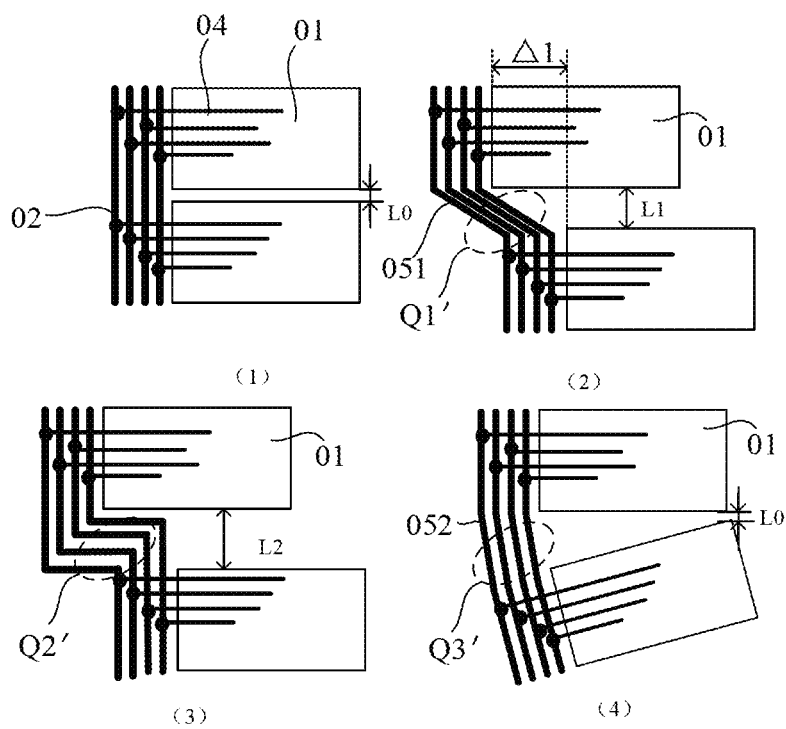
FIG. 2 is a schematic diagram of an arrangement of shift registers in the related art.

FIG. 2 is a schematic diagram of an arrangement of shift registers in the related art.

As shown in FIG. 2(1), two shift registers 01 are aligned in a vertical direction and four driving signal lines 02 are provided. The four driving signal lines 02 are formed in a same layer, and the four driving signal lines 02 are arranged in sequence. Each of the shift registers 01 includes transistors, and a connection line segment 04 connects the corresponding transistor and the driving signal line 02. In a physical structure of the display panel, the arrangement of the transistors is fixed, and the connection line segment 04 is connected to a fixed position in the shift register 01, so the arrangement of the connection line segments 04 is fixed. In this case, it requires that it the driving signal line 02 at a side of shift register 01 has a certain positional relationship with the shift register 01.

As shown in FIG. 2(2), two shift registers 01 are misaligned in a vertical direction. In order to meet the connection between the driving signal line 02 and the connection line segment 04, the driving signal line 02 needs to be formed as a polyline. As shown at a position of an area Q1', the driving signal line 02 includes a first transition line segment 051. In order to ensure that the first transition line segments 051 in the area Q1' are insulated from one another, it needs to increase a distance between the two shift registers 01 in a vertical direction. By comparing FIG. 2(1) and FIG. 2(2), it can be seen that a distance between the two shift registers 01 in a vertical direction increases from L0 to L1. However, in a case of the limited space of the non-display area NA in a vertical direction, a distance between two adjacent shift registers 01 in a vertical direction being large will lead to a reduction in the number of the shift registers 01 arranged in the vertical direction. As a result, the number of the shift registers 01 in the corner non-display area NAG cannot meet the design requirements. Moreover, if a misalignment distance Δ1 between the two shift registers 01 is fixed, the larger the number of the driving signal lines 02 in the area Q1', the larger the distance L1 between the two shift registers 01 in the vertical direction.

FIG. 2(3) shows another design in the related art, and has a difference from FIG. 2(2) in terms of a shape of the transition line segment in the area Q2'. However, since the driving signal line 02 itself has a certain width and there is a certain distance between two adjacent driving signal lines 02, the wiring design shown in FIG. 2(3) also increases a distance between two adjacent shift registers 01 in the vertical direction. By comparing FIG. 2(1) and FIG. 2(3), it can be seen that the distance between the two shift registers 01 increases from L0 to L2.

Due to certain problems in the designs shown in FIG. 2(2) and FIG. 2(3), a design shown in FIG. 2(4) is adopted in the related art. As shown in FIG. 2(4), the shift register 01 in the corner non-display area NAG is obliquely arranged, and a minimum distance between two adjacent shift registers 01 is L0. For example, the driving signal line 02 at a position of an area Q3' includes a second transition line segment 052. By comparing FIG. 2(2) and FIG. 2(4), it can be seen that when the shift register 01 is obliquely arranged, the distance between two adjacent second transition line segments 052 is larger than a distance between two adjacent first transition line segments 051. Therefore, it can ensure that the driving signal lines 02 in the area Q3' are insulated from one other, which can meet the connection between the connection line segment 04 and the driving signal line 02, and allows the shift registers 01 to be closely arranged.

The structure shown FIG. 1 adopts the design as shown in FIG. 2(4), in which the shift registers 01 in the corner non-display area NAG are obliquely arranged. With this configuration, there is a misalignment between the shift register 01 in the corner non-display area NAG and the corresponding pixel circuit row, so an oblique line 06 needs to be provided for connecting the shift register 01 and the corresponding gating line 03. These oblique lines 06 increase a width of the corner non-display area NAG, making the width of corner non-display area NAG larger than a width of the straight-edge non-display area NA1. As a result, a width of the non-display area NA at a corner position of the display area AA is inconsistent with a width of the non-display area NA at a straight-edge position of the display area AA, thereby affecting a visual effect thereof.

In order to solve the problems existing in the related art, an embodiment of the present disclosure provides a display panel, where an area position of at least part of the driving signal lines or a layer position of at least part of the driving signal lines in the display panel is designed to save the wiring space of the non-display area, thereby reducing the width of the non-display area.

In some embodiments, at least part of the driving signal lines is arranged in the display area to save the space of the non-display area.

Figure 3:
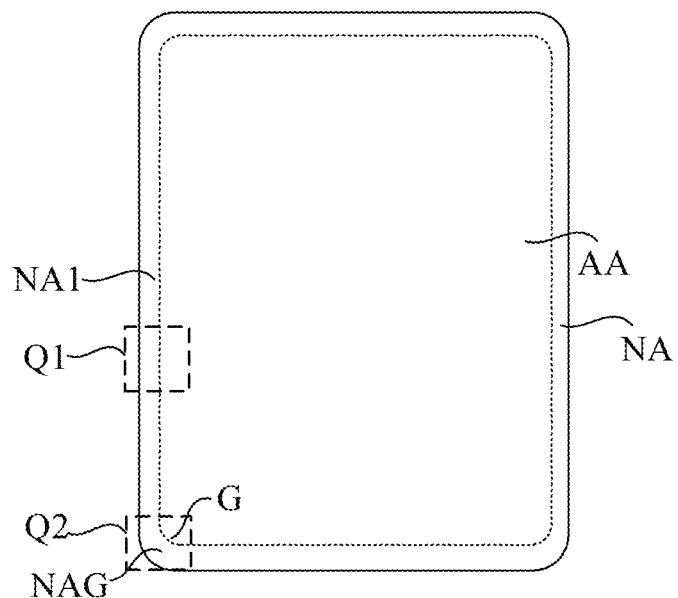
FIG. 3 is a schematic diagram of a display panel according to an embodiment of the present disclosure.
Figure 4:
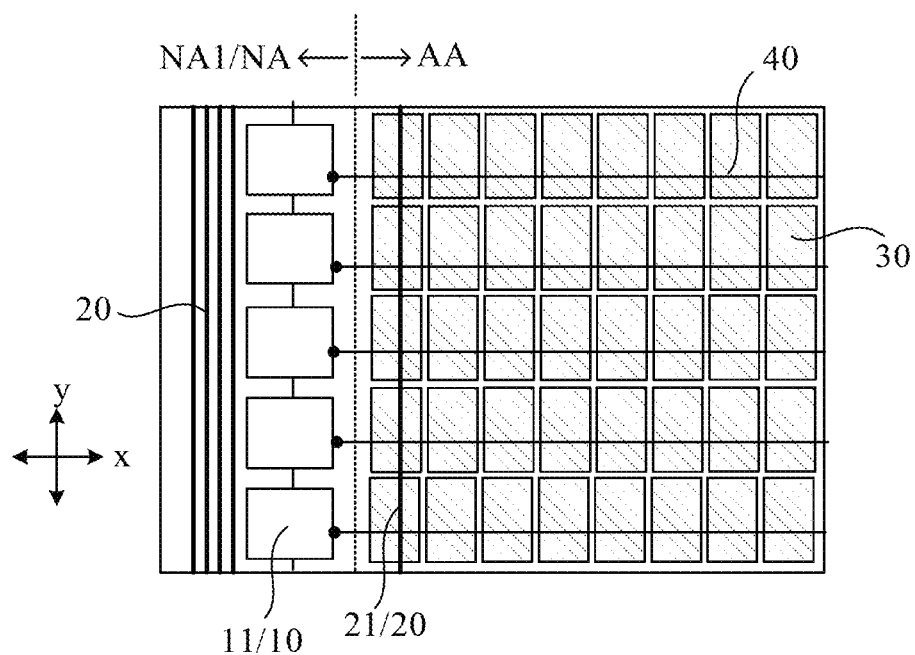
FIG. 4 is an enlarged schematic diagram of an area Q1 shown in FIG. 3.

FIG. 3 is a schematic diagram of a display panel according to an embodiment of the present disclosure. FIG. 4 is an enlarged schematic diagram of an area Q1 shown in FIG. 3. As shown in FIG. 3, the display panel has a display area AA and a non-display area NA. The non-display area NA surrounds the display area AA. The display area AA has an profiled corner G, and the profiled corner G is an abnormal right-angled corner. In FIG. 3, the profiled corner G is an arc-shaped corner for illustration. The non-display area NA includes a corner non-display area NAG and a straight-edge non-display area NA1. The corner non-display area NAG is adjacent to the profiled corner G. The straight-edge non-display area NA1 is connected to the corner non-display area NAG.

FIG. 4 illustrates a schematic diagram of a position of the straight-edge non-display area NA1. As shown in FIG. 4, the display panel includes a driving circuit 10 and driving signal lines 20. The driving circuit 10 is located in the non-display area NA. The drive circuit 10 includes shift registers 11 that are cascaded. The driving signal lines 20 are configured to provide signals to the driving circuit 10. In FIG. 4, the shift register 11 is only shown as a block diagram, and the shift register 11 may have any circuit structure capable of realizing a signal shift function. The driving signal lines 20 corresponding to the shift registers 11 in the straight-edge non-display area NA1 include at least one first signal line 21 located in the display area AA. As shown in FIG. 4, the display area AA is provided with pixel circuits 30 and gating lines 40. The gating lines 40 each extend along a first direction x. The pixel circuits 30 arranged in the first direction x form a pixel circuit row. The pixel circuits 30 arranged in the first direction x are coupled to the gating line 40, and the gating line 40 is coupled to an output terminal of the shift register 11.

In the embodiment shown in FIG. 4, the straight-edge non-display area NA1 extends along a second direction y, which intersects with the first direction x. In the straight-edge non-display area NA1, the shift registers 11 are arranged along the second direction y, the driving signal line 20 driving the shift registers 11 extends along the second direction y, and the driving signal line 20 occupies a certain space of the straight-edge non-display area NA1. In the embodiments of the present disclosure, the driving signal lines 20 include a first signal line 21 located in the display area AA, so that at least part of the driving signal lines 20 originally arranged in the straight-edge non-display area NA1 is actually arranged in the display area AA, thereby saving the wiring space of the straight-edge non-display area NA1, and thus reducing the width of the straight-edge non-display area NA1.

The area Q1 shown in FIG. 4 is located at a left-side frame of the display panel. In an embodiment, the same design as that at the position of the area Q1 is adopted at a right-side frame of the display panel. In a case that the driving circuits 10 provided in the non-display area NA are arranged at bot a left side and a right side of the left side of the display area AA, the positions of the frame at the left side and the right side of the display area AA can adopt the same design as that at the position of the area Q1.

Figure 5:
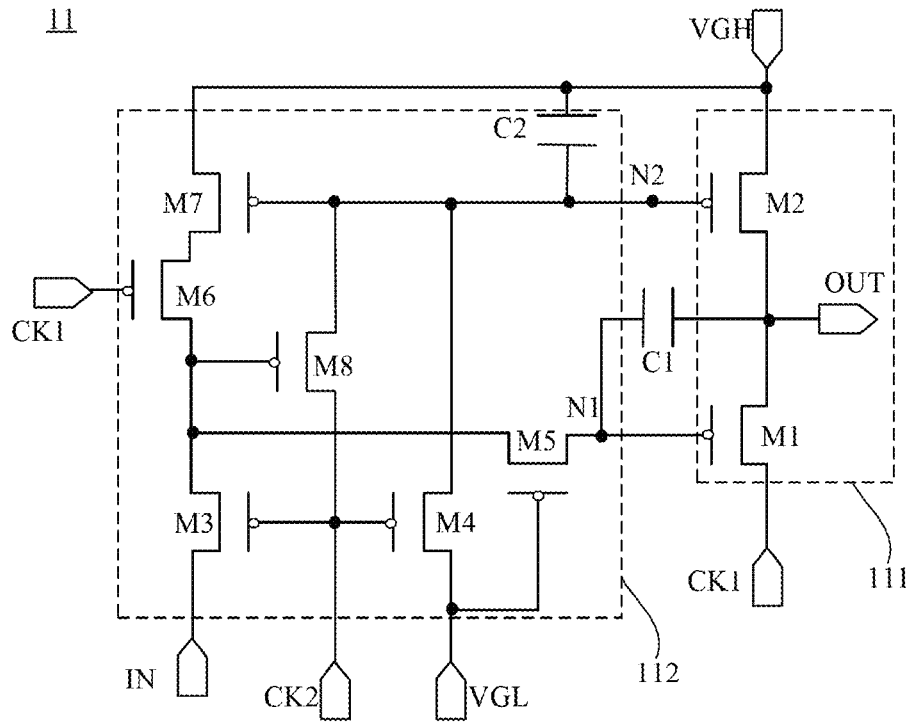
FIG. 5 is a schematic structural diagram of a shift register according to an embodiment of the present disclosure.

FIG. 5 is a schematic structural diagram of a shift register according to an embodiment of the present disclosure. As shown in FIG. 5, the shift register 11 includes a total of eight transistors from M1 to M8, a first capacitor C1 and a second capacitor C2, and a first node N1 and a second node N2. A control electrode of the first transistor M1 is coupled to the first node N1, a first electrode of the first transistor M1 is coupled to a first clock signal line CK1, and a second electrode of the first transistor M1 is coupled to an output terminal OUT of the shift register. A control electrode of the second transistor M2 is coupled to the second node N2, a first electrode of the second transistor M2 is coupled to a first power supply signal line VGH, and a second electrode of the second transistor M2 is coupled to the output terminal OUT of the shift register. In addition, a control electrode of the third transistor M3, a control electrode of the fourth transistor M4 and an electrode of the eighth transistor M8 are connected to a second clock signal line CK2, and a first electrode of the third transistor M3 is coupled to an input terminal IN of the shift register. A first electrode of the fourth transistor M4 and a control electrode of the fifth transistor M5 are coupled to a second power supply signal line VGL. A control electrode of the sixth transistor M6 is coupled to a first clock signal line CK1. The shift register are cascaded in the display panel. An input terminal IN of a first shift register is connected to a start signal line, and an input terminal IN of an m-th shift register is connected to an output terminal OUT of an (m−1)-th shift register, where m is an integer greater than or equal to 2. The driving signal lines 20 for driving the shift registers include a start signal line, a first clock signal line CK1, a second clock signal line CK2, a first power supply signal line VGH, and a second power supply signal line VGL.

Figure 6:
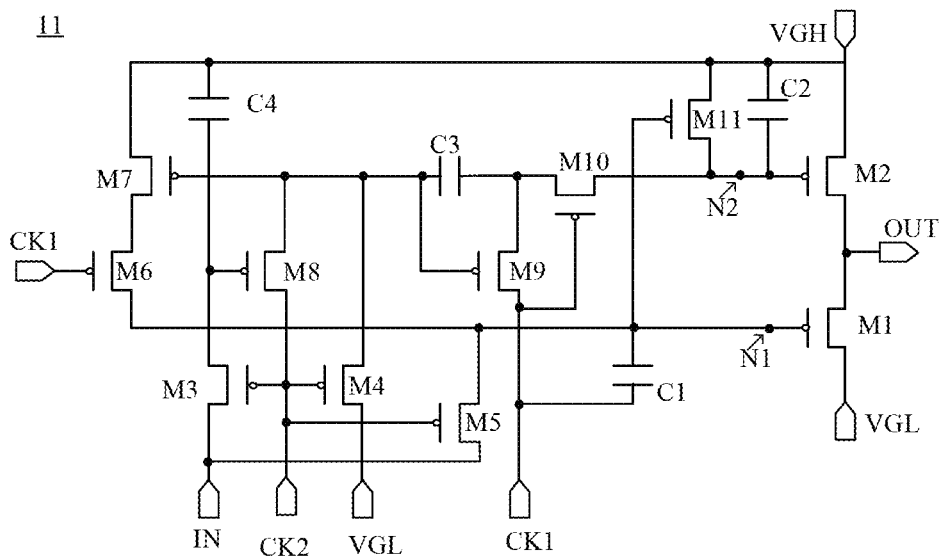
FIG. 6 is a schematic structural diagram of another shift register according to an embodiment of the present disclosure.

FIG. 6 is a schematic structural diagram of another shift register according to an embodiment of the present disclosure. In another embodiment, as shown in FIG. 6, the shift register includes a total of eleven transistors from M1 to M11, a first capacitor C1, a second capacitor C2, a third capacitor C3, a fourth capacitor C4, a first node N1, and a second node N2. A control electrode of the first transistor M1 is coupled to the first node N1, a first electrode of the first transistor M1 is coupled to a second power supply signal line VGL. A control electrode of the second transistor M2 is coupled to the second node N2, and a first electrode of the second transistor M2 is coupled to a first power supply signal line VGH. Both a second electrode of the first transistor M1 and a second electrode of the second transistor M2 are coupled to an output terminal OUT of the shift register. A control electrode of the sixth transistor M6, a control electrode of the tenth transistor M10, a first electrode of the ninth transistor M9, and an electrode of the first capacitor C1 are all connected to a first clock signal line CK1. A control electrode of the third transistor M3, a control electrode of the fourth transistor M4, a control electrode of the fifth transistor M5, and a first electrode of the eighth transistor M8 are all coupled to a second clock signal line CK2. A first electrode of the third transistor M3 and a first electrode of the fifth transistor M5 are both coupled to an input terminal IN of the shift register, and a first electrode of the fourth transistor M4 is coupled to the second power supply signal line VGL. The shift registers are cascaded in the display panel. An input terminal IN of a first shift register is connected to a start signal line, and an input terminal IN of an m-th shift register is connected to an output terminal OUT of an (m−1)-th shift register. In this embodiment, the driving signal lines 20 for driving the shift registers include a start signal line, a first clock signal line CK1, a second clock signal line CK2, a first power supply signal line VGH, and a second power supply signal line VGL.

FIG. 5 and FIG. 6 each show a structure of the shift register for illustrating the driving signal lines 20 in the embodiments of the present disclosure. In the embodiments of the present disclosure, the driving signal lines include at least a start signal line, a clock signal line, and a power supply signal line. The start signal line is electrically connected to a first shift register 11 in the driving circuit 10, and the start signal line provides a start signal to the driving circuit 10. The clock signal lines include a first clock signal line CK1 and a second clock signal line CK2. The clock signal line provides a periodic pulse signal. The power supply signal lines include a first power supply signal line and a second power supply signal line. Each of the first power supply signal line and the second power supply signal line provides a constant voltage signal. A voltage value of a voltage signal provided by the first power supply signal line is greater than a voltage value of a voltage signal provided by the second power supply signal line. In an embodiment, the first power supply signal line VGH is a positive power supply signal line, and the second power supply signal line VGL is a negative power supply signal line.

In the embodiment as shown in FIG. 4, a first signal line 21 of the driving signal lines 20 is located in the display area AA, and the first signal line 21 includes any one of a start signal line, a clock signal line, or a power supply signal line. In some embodiments, the first signal line 21 includes a clock signal line, and two clock signal lines of the driving signal lines 20 are located in the display area AA. In some other embodiments, the first signal line 21 includes a power supply signal line, and two power supply signal lines of the driving signal lines 20 are located in the display area AA. In some other embodiments, the start signal line, the clock signal line, and the power supply signal line of the driving signal lines 20 are all located in the display area AA.

Figure 7:
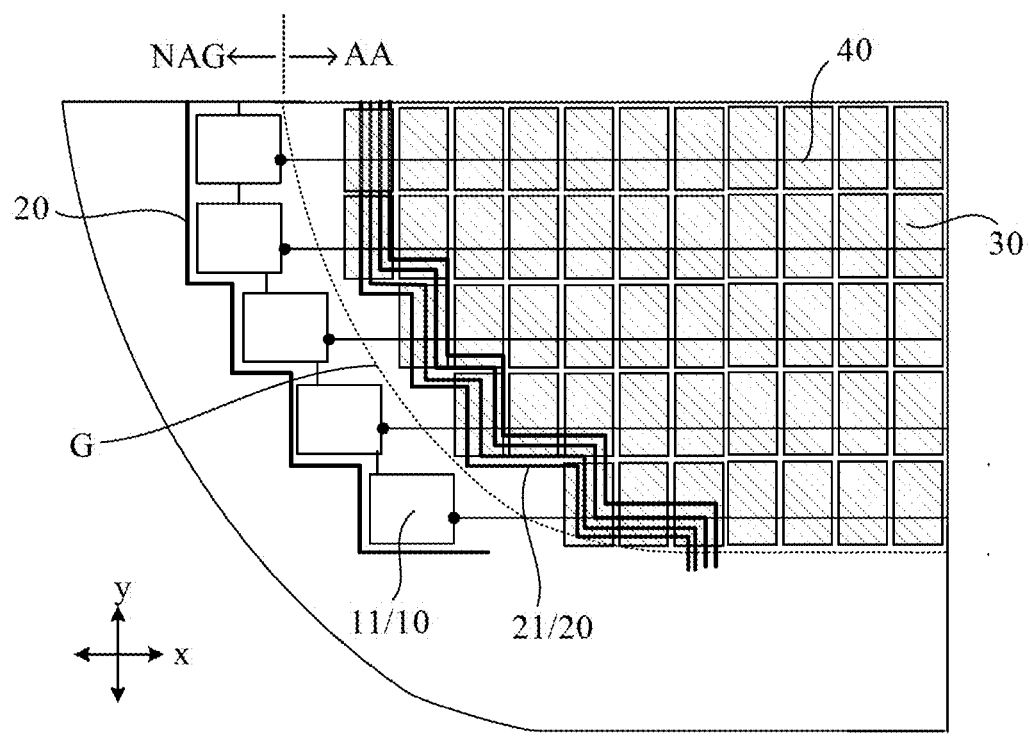
FIG. 7 is an enlarged schematic diagram of an area Q2 shown in FIG. 3.

FIG. 7 is an enlarged schematic diagram of an area Q2 shown in FIG. 3. FIG. 7 shows a schematic diagram of a position of the corner non-display area NAG. As shown in FIG. 7, the corner non-display area NAG is provided with shift registers 11, and the driving signal lines 20 corresponding to the shift registers 11 provided in the corner non-display area NAG include at least one first signal line 21 located in the display area AA, so that at least part of the driving signal lines 20 originally arranged in the corner non-display area NAG is actually arranged in the display area AA, thereby saving the wiring space of the corner non-display area NAG, and thus reducing the width of the corner non-display area NAG. In this way, a width difference between the straight-edge non-display area NA1 and the corner non-display area NAG can be reduced.

In the display area AA, the pixel circuits 30 arranged in the first direction x form a pixel circuit row, and the pixel circuits 30 arranged in the second direction y form a pixel circuit column. In the embodiment as shown in FIG. 7, part of the first signal lines 21 extending in the second direction y located in the display area AA overlaps with one pixel circuit column for illustration. In other embodiments, part of the first signal lines 21 extending in the second direction y overlaps with two pixel circuit columns. In some other embodiments, part of each of the first signal lines 21 extending in the second direction y overlaps with one pixel circuit column.

The area Q2 shown in FIG. 7 is located at a position of a lower left corner of the display panel. In an embodiment, a position of the lower left corner of the display panel adopts the same design as a position of the area Q2. In a case that the driving circuits 10 are provided at both a position of a left corner and a position of a right corner of the display area AA, in this case, the position of the left corner and the position of the right corner of the display area AA can adopt the same design as the position of the area Q2.

In some embodiments, the display panel includes a first connection line. At least one shift register 11 is coupled to the first signal line 21 through the first connection line. The first connection line extends from the non-display area NA to the display area AA. The electric signal transmitted by the first signal line 21 is provided to the corresponding shift register 11 through the first connection line, so as to drive the shift register 11. When the first signal line 21 includes a start signal line, the first shift register in the driving circuit 10 is coupled to the first signal line 21 through the first connection line. When the first signal line 21 includes a clock signal line and/or a power supply signal line, the shift register 11 in the driving circuit 10 is directly or indirectly coupled to the first signal line 21 through the first connection line.

Figure 8:
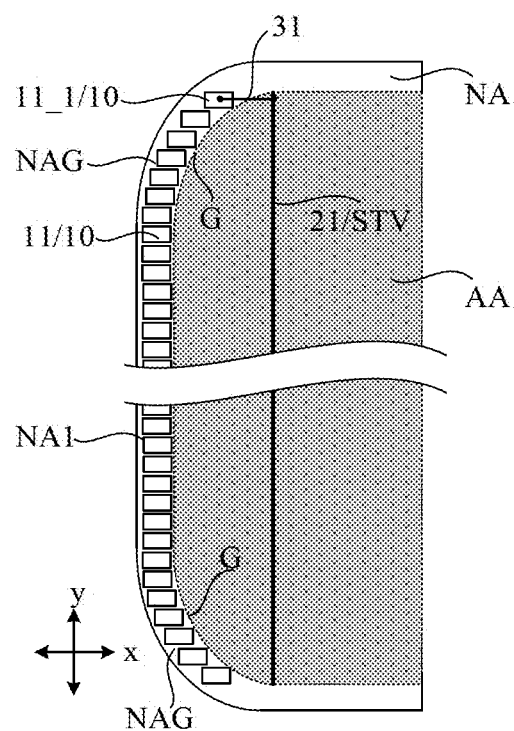
FIG. 8 is a partial schematic diagram of another display panel according to an embodiment of the present disclosure.

FIG. 8 is a partial schematic diagram of another display panel according to an embodiment of the present disclosure. In an embodiment, FIG. 8 schematically shows part of the display area AA and part of the non-display area NA adjacent to the part of the display area AA. As shown in FIG. 8, the display area AA has two profiled corners G in the second direction y, two corner non-display areas NAG are adjacent to the two profiled corners G, and a straight-edge non-display area NA1 is between the two corner non-display areas NAG. Shift registers 11 are provided both in the corner non-display area NAG and in the straight-edge non-display area NA1. The first signal line 21 is located in the display area AA, and the first signal line 21 includes a start signal line STV. Among the shift registers 11 that are cascaded, the first shift register 11_1 is located in the corner non-display area NAG. The first shift register 11_1 is connected to the first signal line 21 through the first connection line 31. It can be seen that the first connection line 31 extends from the non-display area NA to the display area AA. The display area AA is provided with gating lines (not shown in FIG. 8) each extending along the first direction x, and the first signal line 21 extends along the second direction y. The first signal line 21 may be any one of a straight line, a polyline, and a curve. In FIG. 8, the first signal line 21 is a straight line for illustration, which is not intended to limit the present disclosure.

Figure 9:
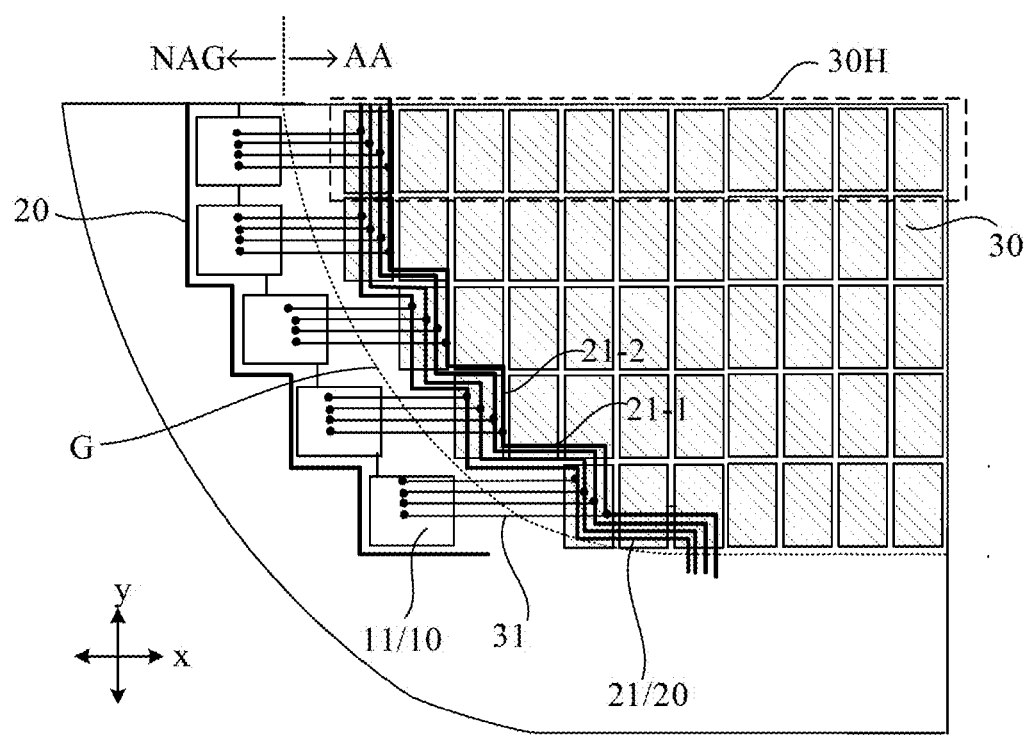
FIG. 9 is a partial schematic diagram of another display panel according to an embodiment of the present disclosure.

FIG. 9 is a partial schematic diagram of another display panel according to an embodiment of the present disclosure. In another embodiment, taking a position of the corner of the display panel as an example, as shown in FIG. 9, at least part of the shift registers 11 in the corner non-display area NAG is coupled to the first signal line 21 through the first connection line 31. The first connection line 31 extends from the non-display area NA to the display area AA. In order to illustrate the connection relationship between the first connection line 31 and the first signal line 21, the gating line extending along the first direction x in the display area AA is not shown in FIG. 9. In the embodiments of the present disclosure, at least part of the driving signal lines 20 originally arranged in the corner non-display area NAG is actually arranged in the display area AA, and the shift register 11 is electrically connected to the driving signal line 20 in the display area AA (that is, the first signal lines 21) through the first connection line 31. The configuration according to the embodiments of the present disclosure can reduce the number of the driving signal lines 20 arranged in the corner non-display area NAG. It can be understood in combination with the description of the related art as shown in FIG. 1 and FIG. 2. When part of the driving signal lines 20 is remained in the corner non-display area NAG, and the shift registers 11 that are misaligned in the second direction y (i.e., the vertical direction shown in FIG. 2) are all placed upright, the design according to the embodiments of the present disclosure can reduce a distance between two adjacent shift registers 11 in the second direction y compared with that in the related art. When the driving signal line 20 originally arranged in the corner non-display area NAG is actually arranged in the display area AA, and the shift registers 11 in the corner non-display area NAG are placed upright, a distance between two adjacent shift registers 11 in the second direction yin the corner non-display area NAG is basically the same as a distance between two adjacent shift registers 11 in the second direction y in the straight-edge non-display area NA1. With the design according to the embodiments of the present disclosure, in the corner non-display area NAG, the shift register 11 does not need to be obliquely arranged for the electrical connection between the shift register 11 and the driving signal line 20, which is beneficial to realize the upright placement of the shift register 11 and reduce the distance between adjacent upright shift registers 11 in the second direction y. In this way, it is beneficial to achieve alignment between the shift register 11 and the corresponding pixel circuit row. In the embodiments of the present disclosure, when the shift register 11 is connected to the gating line in the display area AA, an oblique line 06 shown in FIG. 1 does not need to be provided, thereby saving the space of the corner non-display area NAG and reducing a distance between the shift register 11 in the corner non-display area NAG and the display area AA, and thus reducing a width of the frame in the corner non-display area NAG. In this way, a width difference between the straight-edge non-display area NA1 and the corner non-display area NAG can be reduced, thereby improving the visual effect thereof.

In the embodiment shown in FIG. 9, four first signal lines 21 are arranged in the display area AA, and one driving signal line 20 is arranged in the corner non-display area NAG. The driving signal line 20 in the corner non-display area NAG is a start signal line. The first signal lines 21 located in the display area AA include two clock signal lines and two power supply signal lines. That is, the shift register 11 that is arranged in the corner non-display area NAG is connected to the clock signal line and the power supply signal line that are arranged in the display area AA through the first connection line 31, respectively.

Figure 10:
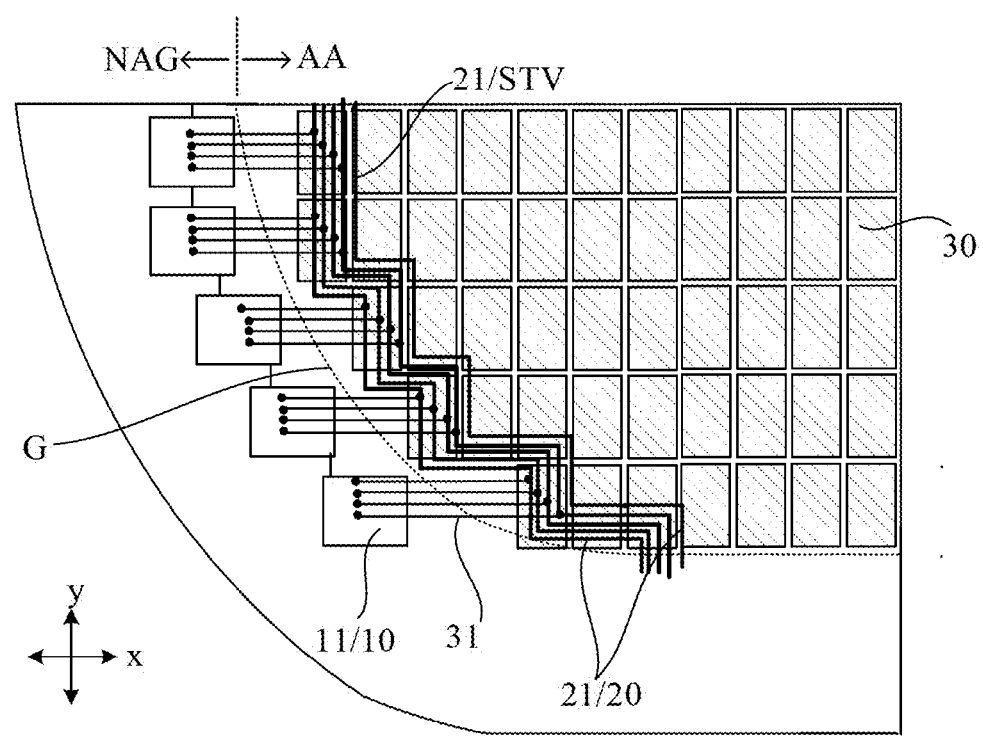
FIG. 10 is a partial schematic diagram of another display panel according to an embodiment of the present disclosure.

FIG. 10 is a partial schematic diagram of another display panel according to an embodiment of the present disclosure. In another embodiment, as shown in FIG. 10, at the position of the corner of the display panel, five first signal lines 21 are provided in the display area AA where the profiled corner G is located, that is, the driving signal lines 20 originally arranged in the corner non-display area NAG are all actually arranged in the display area AA, and the electrical connection between the shift register 11 and the corresponding first signal line 21 is achieved through the first connection line 31. No driving signal line 20 being arranged in the corner non-display area NAG can save the wiring space of the corner non-display area NAG, and a distance between the shift register 11 in the corner non-display area NAG and the display area AA can be reduced. Therefore, a width of the frame in the corner non-display area NAG can be reduced, thereby reducing a difference between the width of the corner non-display area NAG and the width of the straight-edge non-display area NA1.

In addition, as shown in FIG. 10, the first signal lines 21 include a start signal line STV, and the start signal line STV is farthest from the profiled corner G among all the first signal lines 21. In this case, when the first connection line 31 extends from a position, which is connected to the first signal line 21, to the corner non-display area NAG, the first connection line 31 does not overlap with the start signal line STV. In other words, the number of the signal lines overlapping with the first connection line 31 is reduced, thereby reducing the coupling capacitance generated by the overlap of the signal lines.

In some embodiments, the driving signal lines 20 include a start signal line, a clock signal line and a power supply signal line. The first signal line 21 in the display area AA includes at least one power supply signal line. The shift register 11 in the corner non-display area NAG is connected to the power supply signal line in the display area AA through the first connection line 31.

In other embodiments, the first signal lines 21 in the display area AA include at least one clock signal line. The shift register 11 in the corner non-display area NAG is connected to the clock signal line in the display area AA through the first connection line 31. No drawings are shown herein.

Figure 11:
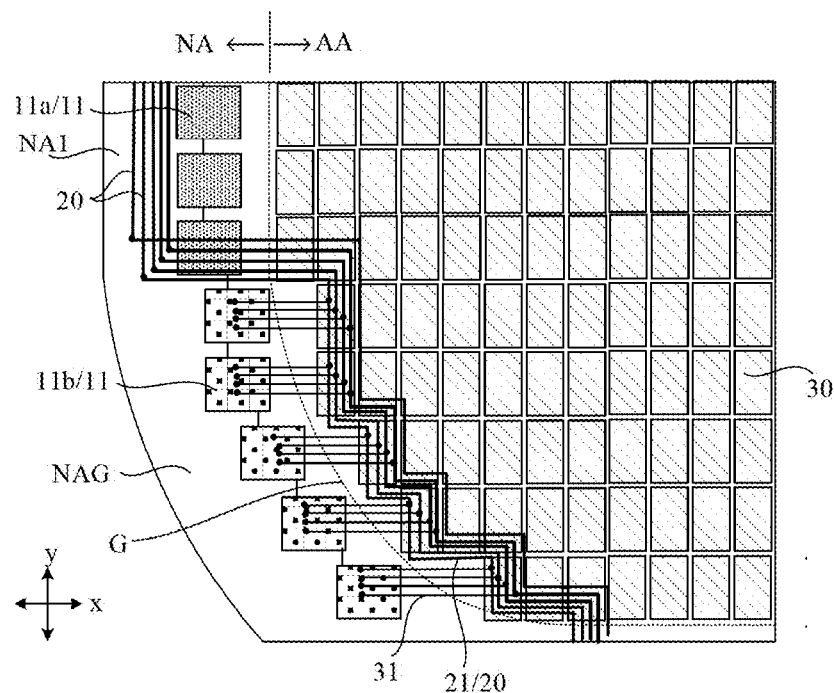
FIG. 11 is a partial schematic diagram of another display panel according to an embodiment of the present disclosure.

FIG. 11 is a partial schematic diagram of another display panel according to an embodiment of the present disclosure. In an embodiment, as shown in FIG. 11, the corner non-display area NAG is connected to the straight-edge non-display area NA1 extending in the second direction y. The shift registers 11 include a first shift register 11a and a second shift register 11b, the first shift register 11a is located in the straight-edge non-display area NA1, and the second shift register 11b is located in the corner non-display area NAG. The first shift register 11a and the second shift register 11b are named according to their positions in the non-display area. In fact, multiple shift registers 11 in the driving circuit 10 are arranged sequentially and cascaded in the non-display area NA. That is, the first shift register 11a and the second shift register 11b are cascaded at a junction between the straight-edge non-display area NA1 and the corner non-display area NAG. The shift register 11 includes transistors. The shift register 11 may have the structure as shown in FIG. 5 or FIG. 6, or the shift register 11 may have another circuit structure capable of realizing the signal shifting function.

In the embodiments of the present disclosure, the channels of the transistors with the same function in the first shift register 11a and the second shift register 11b extend in a same direction, so that the transistors in the first shift register 11a and the second shift register 11b can have a same arrangement. Then, the second shift register 11b is upright relative to the first shift register 11a. The second shift register 11b in the corner non-display area NAG is not obliquely arranged for adapting to the profiled corner G. In this way, the second shift register 11b is aligned with the corresponding pixel circuit row, so the connection between the second shift register 11b and the corresponding gating line is more convenient, without needing to provide an oblique line in the corner non-display area NAG as shown in FIG. 1. Therefore, the wiring space of the corner non-display area NAG can be saved, and a width of the frame in the corner non-display area NAG can be reduced.

In some embodiments, as shown in FIG. 11, both the first shift register 11a and the second shift register 11b are schematically shown in block diagrams, and it can be seen that an outer contour shape of the first shift register 11a is the same as an outer contour shape of the second shift register 11b. An edge of the shift register 11 can be illustrated as an outer contour edge of the graphic shape jointly occupied by multiple transistors in the shift register 11. At a side adjacent to the display area AA, an extending direction of the edge of the first shift register 11a is the same as an extending direction of the edge of the second shift register 11b. As shown in FIG. 11, in the two areas, the edges of the shift registers 11 adjacent to the display area AA each extend along the second direction y. Then, the edge of the second shift register 11b adjacent to the display area AA is not configured for adapting the shape of the profiled corner G, that is, the second shift register 11b does not need to be obliquely arranged relative to the first shift register 11a. With such a configuration, the second shift register 11b can be aligned with the corresponding pixel circuit row, so the connection between the second shift register 11b and the corresponding gating line is more convenient, without needing to provide an oblique line in the corner non-display area NAG as shown in FIG. 1. Therefore, the wiring space of the corner non-display area NAG can be saved, and a width of the frame in the corner non-display area NAG can be reduced.

Figure 12:
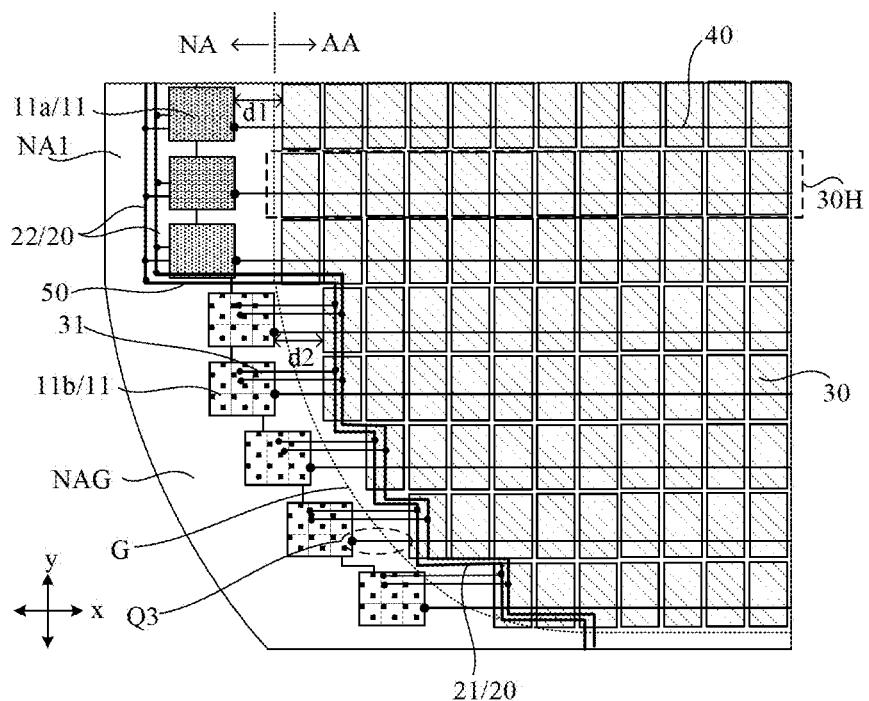
FIG. 12 is a partial schematic diagram of another display panel according to an embodiment of the present disclosure.

FIG. 12 is a partial schematic diagram of another display panel according to an embodiment of the present disclosure. In some embodiments, in order to clearly illustrate the positions and connections of the various structures, FIG. 12 merely illustrates two first signal lines 21 located in the display area AA. As shown in FIG. 12, the pixel circuits 30 are arranged in the first direction to form a pixel circuit row 30H, and the pixel circuits 30 in a same pixel circuit row 30H are coupled to a same gating line 40. An output terminal of the shift register 11 is coupled to the gating line 40. In the first direction x, the shift register 11 in the corner non-display area NAG is aligned with the pixel circuit row 30H. FIG. 12 shows that the second shift register 11b is arranged in the corner non-display area NAG, and the second shift register 11b is aligned with the pixel circuit row 30H. In this case, the misalignment distance between the second shift register 11b and the gating line 40 coupled thereto in the first direction x is relatively small or basically zero. As shown in the area Q3 in FIG. 12, the connection line extending from the output terminal of the second shift register 11b extends from the corner non-display area NAG to the display area AA, and is then connected to the gating line 40 in the display area AA. In this embodiment, an oblique line as shown in FIG. 1 is not required, thereby saving the wiring space of the corner non-display area NAG, and thus reducing the width of the corner non-display area NAG.

In addition, as shown in the area Q3 in FIG. 12, the connection line extending from the output terminal of the second shift register 11b is a straight line, but the connection line at this position may also be a polyline or a curved line.

As shown in FIG. 12, the shift registers 11 includes a first shift register 11a, and the first shift register 11a is located in the straight-edge non-display area NA1. In the first direction x, a distance between the first shift register 11a and the pixel circuit row 30H is referred to as a first distance d1, a distance between the second shift register 11b and the pixel circuit row 30H is referred to as a second distance d2, and the first distance d1 is equal to the second distance d2. The distance between the shift register 11 and the pixel circuit row 30H in the first direction x can be illustrated as a distance between an edge of the shift register 11 and an edge of the first pixel circuit in the pixel circuit row 30H in the first direction x. As shown in FIG. 12, the first shift registers 11a are arranged along the second direction y in the straight-edge non-display area NA1, adjacent first shift registers 11a are basically aligned in the second direction y, and the respective distances between the shift registers 11a and the corresponding pixel circuit rows 30H are basically the same. At a position of the corner of the display panel, at least some of adjacent pixel circuit rows 30H arranged in the display area AA of the display panel are misaligned to form an profiled corner G of the display area AA. With the configuration of d1=d2, the width of the frame in the corner non-display area NAG can be reduced, and a difference between the width of the frame in the corner non-display area NAG and the width of the frame in the straight-edge non-display area NA1 can be reduced, thereby improving the display visual effect.

In the embodiments of the present disclosure, at least part of the driving signal lines 20 originally arranged in the corner non-display area NAG is actually arranged in the display area AA, and the driving signal line 20 in the display area AA is connected to the second shift register 11b through the first connection line 31. Therefore, the second shift register 11b can be aligned with the corresponding pixel circuit row 30H, thereby reducing a distance between the second shift register 11b and the corresponding pixel circuit row 30H, so that d1=d2 can be realized.

In some embodiments, as shown in FIG. 12, the driving signal lines 20 further include a second signal line 22 located in the non-display area NA, and the second signal line 22 is coupled to the first signal line 21 through a lead 50. The lead 50 extends from the non-display area NA to the display area AA. The second signal line 22 extends in the straight-edge non-display area NA1, and the second signal line 22 ends at a junction between the straight-edge non-display area NA1 and the corner non-display area NAG. The first shift register 11a in the straight-edge non-display area NA1 is coupled to the second signal line 22 correspondingly. In this embodiment, at least part of the driving signal lines 20 originally arranged in the corner non-display area NAG is actually arranged in the display area AA, and the driving signal line 20 located in the display area AA is connected to the second shift register 11b through the first connection line 31. In the corner non-display area NAG, the first shift register 11a does not need to be obliquely arranged for the electrical connection between the first shift register 11a and the driving signal line 20, which is beneficial to realize the alignment of the first shift register 11a and the corresponding pixel circuit row. Moreover, when the first shift register 11a is connected to the gating line 40 in the display area AA, there is no need to provide an oblique line 06 as shown in FIG. 1, thereby saving the space of the corner non-display area NAG and thus reducing a distance between the shift register 11 in the corner non-display area NAG and the display area AA. Therefore, the width of the frame in the corner non-display area NAG is reduced, and a difference between a width of the corner non-display area NAG and a width of the straight-edge non-display area NA1 is reduced, thereby improving the display visual effect. In addition, a second signal line 22 is provided in the straight-edge non-display area NA1, the second signal line 22 is coupled to the first signal line 21, and the second signal line 22 provides a driving signal to the first shift register 11a in the straight-edge non-display area NA1. In this way, an original wiring manner of the driving signal line 20 in the straight-edge non-display area NA1 does not need to be changed. In an embodiment, the lead 50 is located between two adjacent shift registers 11, so as to avoid signal coupling caused by the lead 50 overlapping with the shift registers 11.

Figure 13:
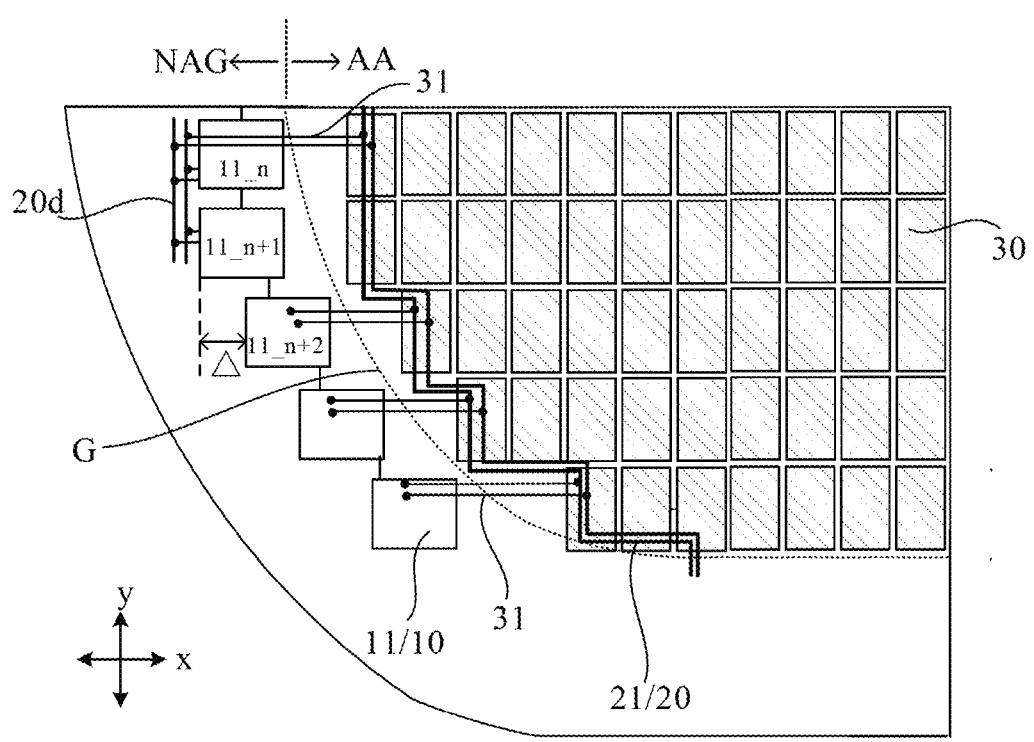
FIG. 13 is a partial schematic diagram of another display panel according to an embodiment of the present disclosure.

FIG. 13 is a partial schematic diagram of another display panel according to an embodiment of the present disclosure. In an embodiment, as shown in FIG. 13, two first signal lines 21 are arranged in the display area AA for illustration. As shown in FIG. 13, the corner non-display area NAG is provided with a driving signal line segment 20d extending along the second direction y, and the driving signal line segment 20d is coupled to the first signal line 21 through the first connection line 31. In the corner non-display area NAG, each of at least two shift registers 11 that are adjacent and aligned in the second direction y is coupled to the driving signal line segment 20d. FIG. 13 schematically shows an n-th shift register 11_n, an (n+1)-th shift register 11_n+1, and an (n+2)-th shift register 11_n+2 that are cascaded in sequence, where n is a positive integer. The n-th shift register 11_n and the (n+1)-th shift register 11_n+1 are aligned with each other in the second direction y, and the (n+1)-th shift register 11_n+1 and the (n+2)th shift register 11_n+2 are misaligned in the second direction y. The misalignment between adjacent two shift registers 11 in the second direction y means that same edges of the two shift registers 11 arranged along the second direction y have a misalignment distance in the first direction x. As shown in FIG. 13, an edge of the (n+1)-th shift register 11_n+1 and an edge of the (n+2)-th shift register 11_n+2 that are away from the display area AA have a misalignment distance Δ in the first direction x. In this embodiment, the extending direction of the driving signal line segment 20d is the same as a direction in which the adjacent and aligned shift registers 11 are arranged, and the driving signal line segment 20d is connected to the first signal line 21 in the display area AA, so that the number of the first connection lines 31 can be reduced, thereby reducing the number of wiring lines in the display area AA, and reducing the number of through-holes connecting the first connection lines 31 and the first signal lines 21.

In addition, the driving signal line segment 20d is only arranged at one side of the aligned and adjacent shift registers 11, and has no influence on the arrangement of the two shift registers 11 that are misaligned in the second direction y. As shown in FIG. 13, the (n+2)-th shift register 11_n+2 is connected to the first signal line 21 through the first connection line 31, so the (n+2)-th shift register 11_n+2 does not need to be obliquely arranged relative to the (n+1)-th shift register 11_n+1. Therefore, the (n+2)-th shift register 11_n+2 can be aligned with the corresponding pixel circuit row, and no oblique line needs to be provided when the (n+2)-th shift register 11_n+2 is connected to the gating line, thereby reducing the wiring space of the corner non-display area NAG.

Taking the shift register shown in FIG. 5 as an example, the shift register includes an output circuit 111 and a switch circuit 112, and the output circuit 111 of the shift register includes an output terminal OUT, which is coupled to the gating line. In the display panel, the output circuit 111 is located at a side of the switch circuit 112 adjacent to or away from the display area AA. A position of the driving signal line segment 20d can be configured according to the relative positions of the output circuit 111 and the switch circuit 112.

In an embodiment, as shown in FIG. 13, the driving signal line segment 20d is located at a side of the shift register 11 away from the display area AA, thereby reducing a distance between the shift register 11 and the display area AA, and reducing a distance between the output terminal OUT of the shift register 11 and the display area AA. Therefore, a length of the connection line between the output terminal OUT of the shift register 11 and the gating line in the display area AA is reduced. In addition, the output circuit 111 in the shift register 11 may be located at a side of the switch circuit 112 adjacent to the display area AA, so that a distance between the switch circuit 112 and the driving signal line segment 20d is smaller than a distance between the output circuit 111 and the driving signal line segment 20d. With such configuration, it facilitates the connection between the shift register 11 and the driving signal line segment 20d, moreover, the output terminal OUT of the shift register 11 is adjacent to the display area AA, so that a length of the connection line between the output terminal OUT of the shift register 11 and the gating line 40 in the display area AA can be further reduced. Moreover, the connection line between the two does not need to overlap with the driving signal line segment 20d, so that the parasitic capacitance on the connection line can be reduced.

Figure 14:
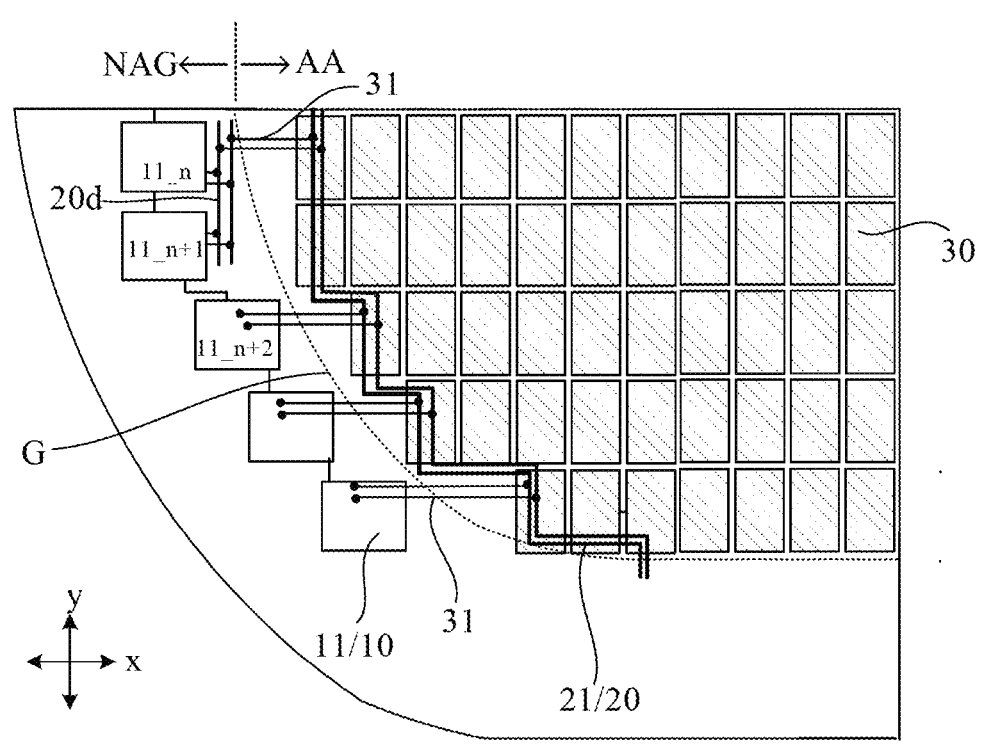
FIG. 14 is a partial schematic diagram of another display panel according to an embodiment of the present disclosure.

FIG. 14 is a partial schematic diagram of another display panel according to an embodiment of the present disclosure. In another embodiment, as shown in FIG. 14, the driving signal line segment 20d is located at a side of the shift register 11 adjacent to the display area AA, thereby reducing the length of the first connection line connecting the driving signal line segment 20d and the first signal line 31. The first connection line 31 does not need to overlap with the n-th shift register 11_n, thereby reducing a voltage drop, and also reducing the parasitic capacitance generated by the overlap and signal interference. Further, the output circuit 111 in the shift register 11 is located at a side of the switch circuit 112 away from the display area AA, therefore, a distance between the switch circuit 112 and the driving signal line segment 20d is smaller than a distance between the output circuit 111 and the driving signal line segment 20d, thereby facilitating the connection between the shift register 11 and the driving signal line segment 20d. Moreover, in this embodiment, the output circuit 111 in the shift register 11 is located at a side of the switch circuit 112 away from the display area AA, thereby reducing the influence on the transistor in the output circuit 111 by the operation temperature of the display area AA, and thus avoiding shifting of a threshold voltage of the transistor in the output circuit 111.

Figure 15:
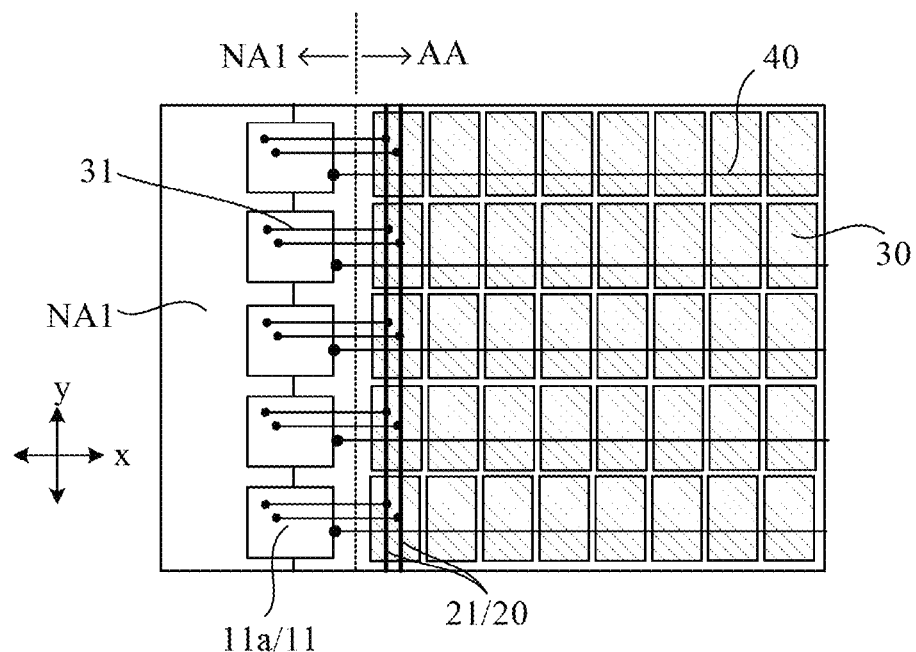
FIG. 15 is a partial schematic diagram of another display panel according to an embodiment of the present disclosure.

FIG. 15 is a partial schematic diagram of another display panel according to an embodiment of the present disclosure. In another embodiment, FIG. 15 illustrates the position of the straight-edge non-display area NA1 of the display panel. As shown in FIG. 15, the shift registers 11 includes a first shift register 11a, and the first shift register 11a is located in the straight-edge non-display area NA1. At least part of the first shift registers 11a in the straight-edge non-display area NA1 is coupled to the first signal line 21 through the first connection line 31. At least part of the driving signal lines 20 originally arranged in the straight-edge non-display area NA1 is actually arranged in the display area AA, and the electrical connection between the first shift register 11a and the driving signal line 20 in the display area AA is achieved through the first connection line 31, thereby saving the space of the straight-edge non-display area NA1 and reducing the width of the straight-edge non-display area NA1. In this embodiment, the first signal line 21 provides a signal to at least one clock signal line and/or at least one power supply signal line of the driving signal lines 20.

Figure 16:
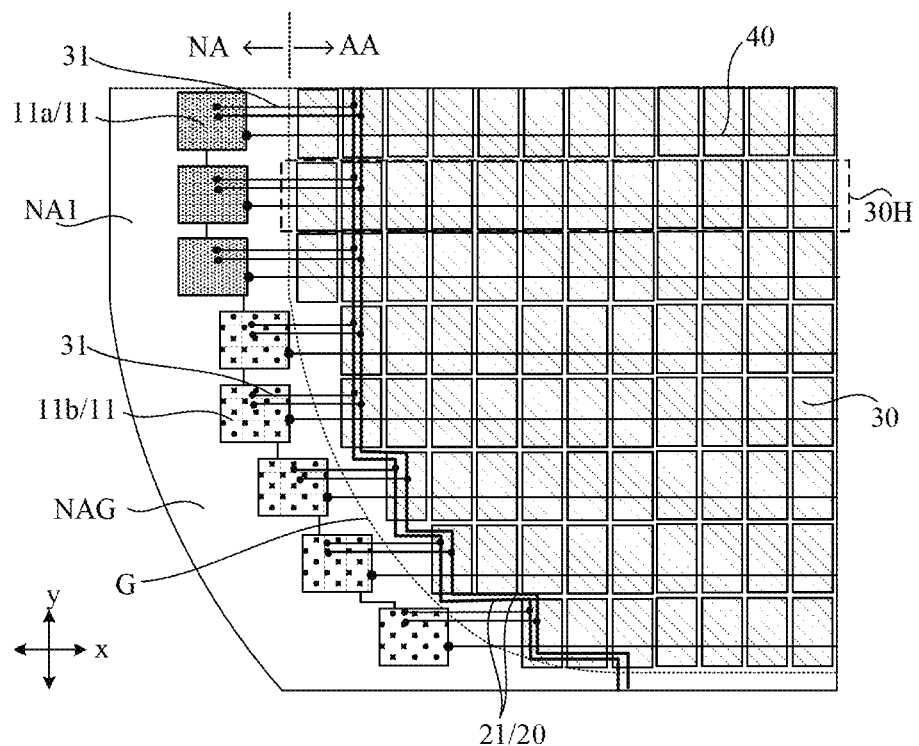
FIG. 16 is a partial schematic diagram of another display panel according to an embodiment of the present disclosure.

FIG. 16 is a partial schematic diagram of another display panel according to an embodiment of the present disclosure.

In another embodiment, as shown in FIG. 16, the driving signal lines 20 include a first signal line 21 located in the display area AA. At least part of the first shift register 11a in the straight-edge non-display area NA1 is coupled to the first signal line 21 through the first connection line 31, and at least part of the second shift register 11b in the corner non-display area NAG is coupled to the first signal line 21 through the first connection line 31. The first signal line 21 extends in the display area AA adjacent to the corner non-display area NAG, and extends into the display area AA adjacent to the straight-edge non-display area NA1. This embodiment can reduce the width of the straight-edge non-display area NA1, and can also reduce the width of the corner non-display area NAG.

Figure 17:
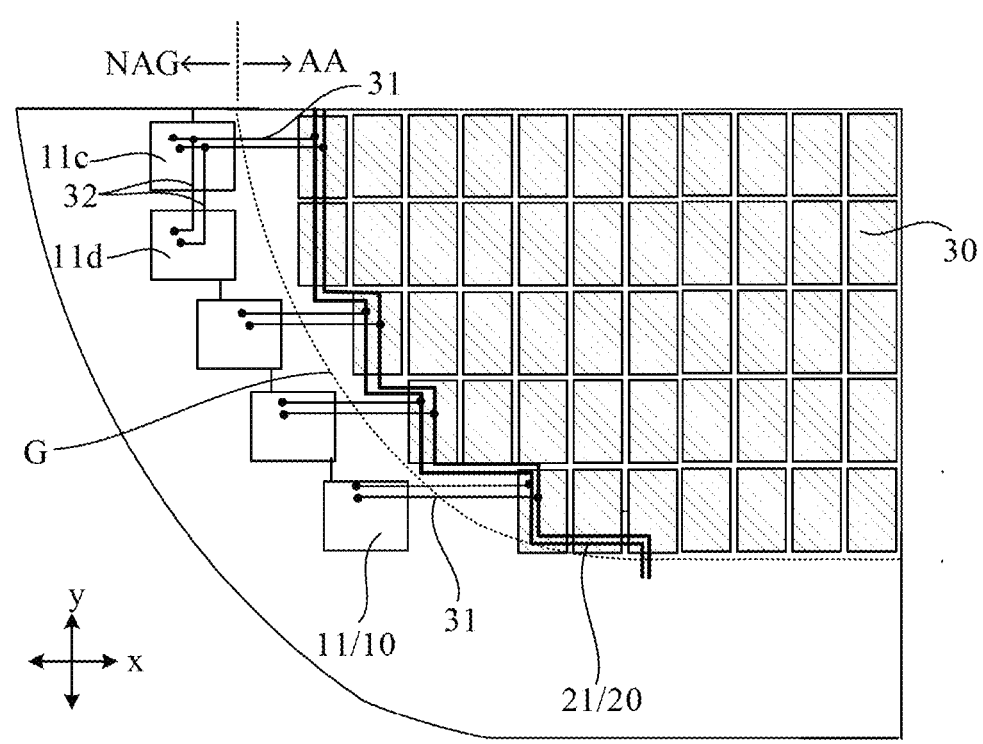
FIG. 17 is a partial schematic diagram of another display panel according to an embodiment of the present disclosure.

FIG. 17 is a partial schematic diagram of another display panel according to an embodiment of the present disclosure. In another embodiment, as shown in FIG. 17, the shift registers 11 includes a third shift register 11c and a fourth shift register 11d. The third shift register 11c is coupled to the first signal line 21 through the first connection line 31. The corner non-display area NAG is provided with a second connection line 32, and the fourth shift register 11d is coupled to the first connection line 31 through the second connection line 32. There is no need to provide the first connection line 31 corresponding to the fourth shift register 11d, so that the number of the first connection lines 31 can be reduced, the number of wiring lines in the display area AA can be reduced, and the number of through-holes for connecting the first connection lines 31 and the first signal lines 21 can also be reduced.

As shown in FIG. 17, the third shift register 11c and the fourth shift register 11d are aligned in the second direction y, which is a direction in which the third shift register 11c and the fourth shift register 11d are arranged, so that the second connection line 32 has a small length. In an embodiment, the third shift register 11c is adjacent to the fourth shift register 11d.

In the embodiment shown in FIG. 17, the corner non-display area NAG is provided with the third shift register 11c and the fourth shift register 11d for illustration. In another embodiment, the straight-edge non-display area NA1 may be provided with the third shift register 11c and the fourth shift register 11d, and the third shift register 11c is coupled to the first signal line 21 through the first connection line 31; and the straight-edge non-display area NA1 is provided with the second connection line 32, and the fourth shift register 11d is coupled to the first connection line 31 through the second connection line 32. In the second direction y, the third shift register 11c and the fourth shift register 11d are aligned with each other. No drawings are shown herein.

Figure 18:
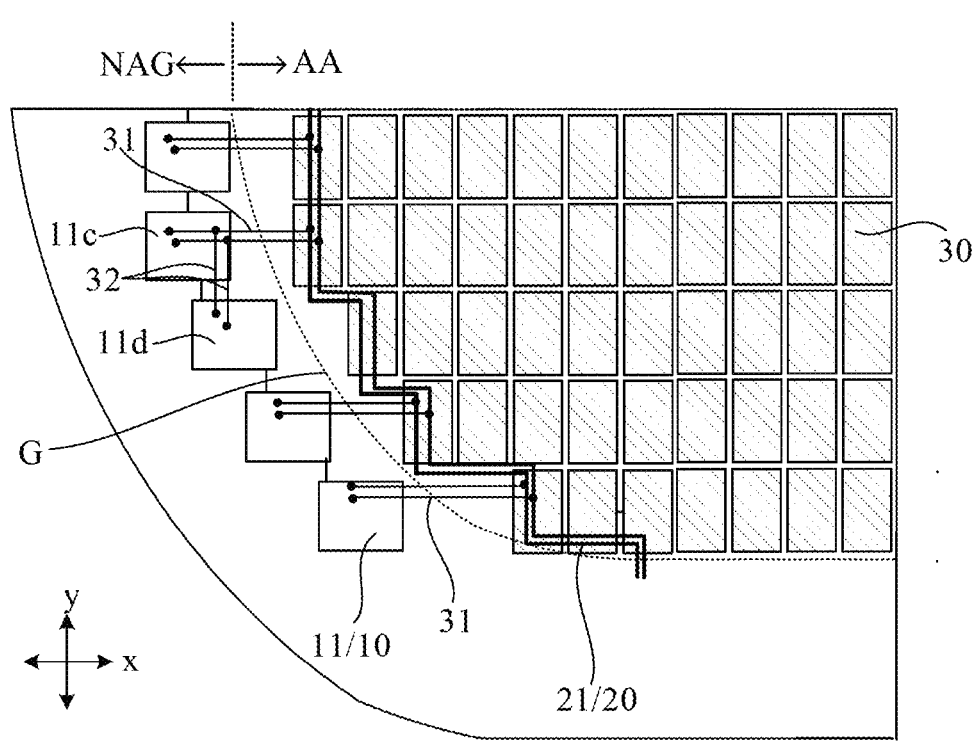
FIG. 18 is a partial schematic diagram of another display panel according to an embodiment of the present disclosure.

FIG. 18 is a partial schematic diagram of another display panel according to an embodiment of the present disclosure. In another embodiment, as shown in FIG. 18, the corner non-display area NAG is provided with a third shift register 11c and a fourth shift register 11d. The third shift register 11c and the fourth shift register 11d are misaligned in the second direction y, which is a direction in which the third shift register 11c and the fourth shift register 11d are arranged.

In another embodiment, the straight-edge non-display area NA1 is provided with the third shift register 11c, and the corner non-display area NAG is provided with the fourth shift register 11d. In the second direction y, the third shift register 11c and the fourth shift register 11d are misaligned, the third shift register 11c is coupled to the first signal line 21 through the first connection line 31, and the fourth shift register 11d is coupled to first connection line 31 through the second connection line 32. No drawings are shown herein.

Figure 19:
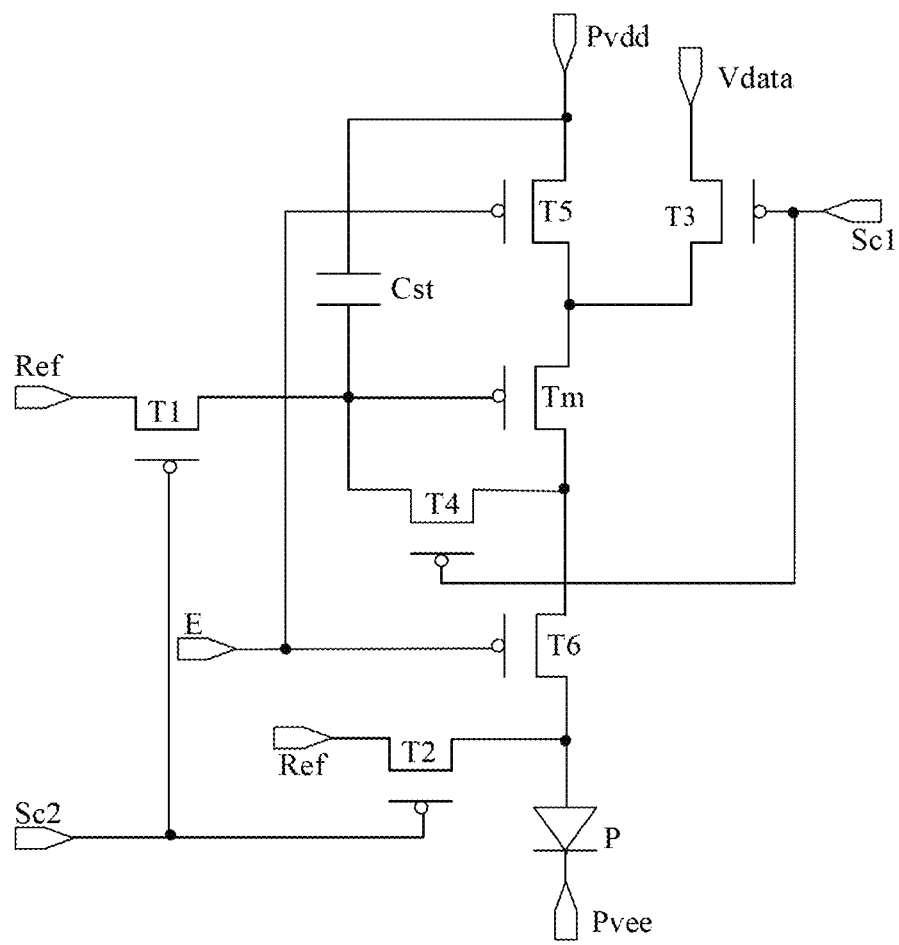
FIG. 19 is a pixel circuit diagram of a display panel according to an embodiment of the present disclosure.

FIG. 19 is a pixel circuit diagram of a display panel according to an embodiment of the present disclosure. As shown in FIG. 19, the pixel circuit includes a drive transistor Tm, a gate reset transistor T1, an electrode reset transistor T2, a data write transistor T3, a threshold compensation transistor T4, a first light-emitting control transistor T5, a second light-emitting control transistor T6, and a storage capacitor $C_{st}$. The display panel shall include scanning lines (such as a first scanning line Sc1 and a second scanning line Sc2), a reset signal line Ref, a positive power supply voltage signal line $P_{vdd}$, a negative power supply voltage signal line $P_{vee}$, a light-emitting control line E, and a data line $V_{data}$. A first electrode of the light-emitting device P is electrically connected to the pixel circuit, and a second electrode of the light-emitting device P is electrically connected to the negative power supply voltage signal line $P_{vee}$.

FIG. 19 shows that the data input transistor T3 and the threshold compensation transistor T4 each are connected to the first scanning line Sc1. In another embodiment, the data input transistor T3 and the threshold compensation transistor T4 are connected to different scanning lines. In an embodiment, the data input transistor T3 is a silicon transistor, and the threshold compensation transistor T4 is a metal oxide transistor. The data input transistor T3 is a p-type transistor, and the threshold compensation transistor T4 is an n-type transistor.

In another embodiment, the gate reset transistor T1 and the electrode reset transistor T2 are connected to different scanning lines. In an embodiment, the gate reset transistor T1 is a silicon transistor, and the gate reset transistor T1 is an n-type transistor.

FIG. 19 shows a 7T1C pixel circuit for illustration, where 7T1C refers to seven transistors and one capacitor. In the embodiments of the present disclosure, the pixel circuit may be an aTbC pixel circuit, where both "a" and "b" are positive integers. For example, the pixel circuit may be a 2T1C pixel circuit, an 8T1C pixel circuit, or an 8T2C pixel circuit, etc.

Figure 20:
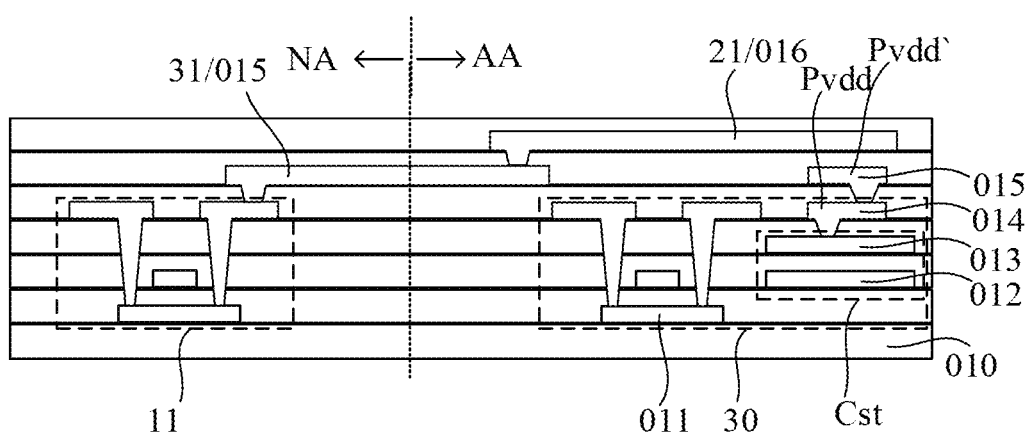
FIG. 20 is a schematic diagram of a layer structure of another display panel according to an embodiment of the present disclosure.

FIG. 20 is a schematic diagram of a layer structure of another display panel according to an embodiment of the present disclosure. As shown in FIG. 20, the display panel includes a substrate 010, and the display panel further includes: a substrate 010a semiconductor layer 011, a first metal layer 012, a capacitance metal layer 013, a second metal layer 014, a third metal layer 015 and a fourth metal layer 016 that are arranged at a side of the substrate 010. FIG. 20 shows only one transistor in the shift register 11 and in the pixel circuit 30, respectively, and an active layer of the transistor is located in the semiconductor layer 011, while a gate electrode of the transistor is located in the first metal layer 012. The pixel circuit 30 includes a storage capacitor $C_{st}$, including a first electrode located in the capacitor metal layer 012, and a second electrode located in the first metal layer 012. In an embodiment, the first metal layer 012 and the capacitance metal layer 013 are made of a same material; and the second metal layer 014, the third metal layer 015 and the fourth metal layer 016 are made of a same material.

In an embodiment, the first scanning line Sc1, the second scanning line Sc2 and the light-emitting control line E are located in the first metal layer 012; the reset signal line Ref is located in the capacitance metal layer 013; the positive power supply voltage signal line $P_{vdd}$ is located in the second metal layer 014; and the data line $V_{data}$ is located in the third metal layer 015.

It can be seen from FIG. 19 that the first electrode of the storage capacitor $C_{st}$ is electrically connected to the positive power supply voltage signal line $P_{vdd}$. FIG. 20 schematically shows that the positive power supply voltage signal line $P_{vdd}$ located in the second metal layer 014 is connected in parallel with a functional power supply line P$_{vdd}$, located in the third metal layer 015, and the functional power supply line P$_{vdd}$, is configured to reduce a voltage drop of the positive power supply voltage signal and improving the uniformity of the entire surface.

In the embodiments of the present disclosure, the first signal line 21 and the first connection line 31 are located in different layers. The first signal line 21 may be located in the fourth metal layer 016, and the first connection line 31 may be located in the third metal layer 015. The first connection line 31 and the first signal line 21 are electrically connected in the display area AA through a through-hole penetrating an insulating layer.

In the embodiments of the present disclosure, the second connection line 32 may be located in the fourth metal layer 016, the second connection line 32 and the first signal line 21 may be located in a same layer, and the second connection line 32 and the first connection line 31 may be located in different layers. As shown in FIG. 17 or FIG. 18, there will be an intersection between the first connection line 31 and the second connection line 32 in the non-display area NA, and arranging them in different layers can avoid short circuit caused by the intersection.

Figure 21:
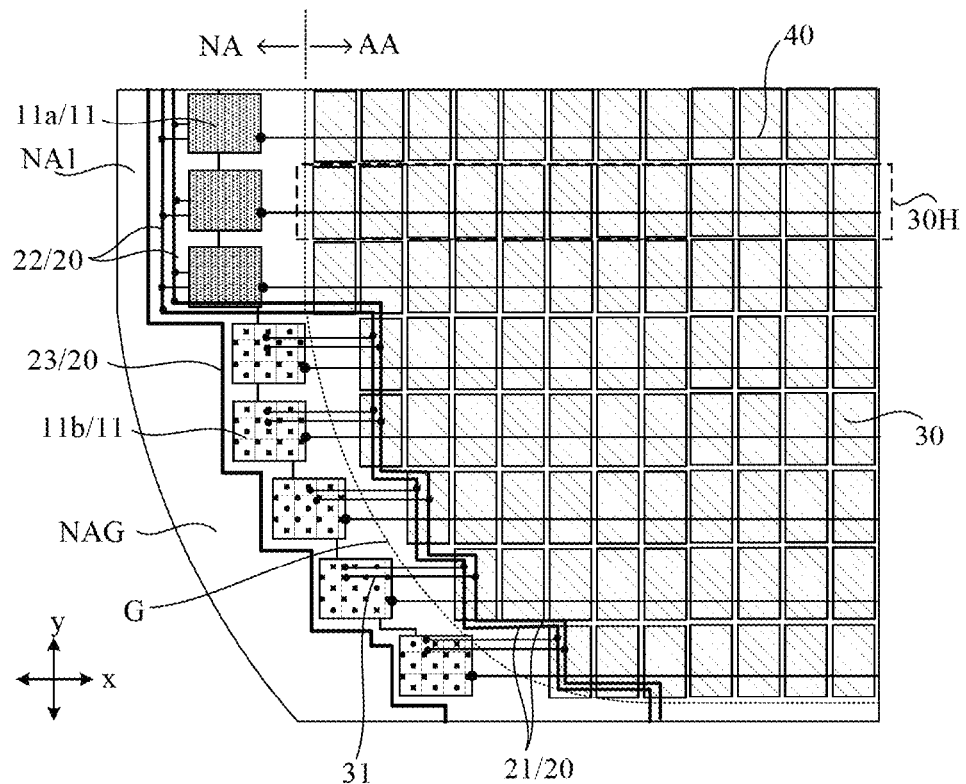
FIG. 21 is a partial schematic diagram of another display panel according to an embodiment of the present disclosure.

FIG. 21 is a partial schematic diagram of another display panel according to an embodiment of the present disclosure. In another embodiment, as shown in FIG. 21, the display area AA has an profiled corner G, and the non-display area NA includes a corner non-display area NAG and a straight-edge non-display area NA1. The corner non-display area NAG is adjacent to the profiled corner G, and the straight-edge non-display area NA1 is connected to the corner non-display area NAG. The first shift register 11a is located in the straight-edge non-display area NA1, and the second shift register 11b is located in the corner non-display area NAG. The driving signal lines 20 include a third signal line 23 extending in the corner non-display area NAG and extending from the corner non-display area NAG to the straight-edge non-display area NA1. In this embodiment, the third signal line 23 of the driving signal lines 20 is still arranged in the non-display area NA. In an example, the third signal line 23 is a start signal line STV. In the driving circuit, only the input terminal of the first shift register needs to be electrically connected to the third signal line 23. Taking the corner non-display area NAG located at the lower frame of the display panel in FIG. 21 as an example, the second shift register 11b does not need to be electrically connected to the third signal line 23, and the third signal line 23 can be arranged along outer edges of the second shift registers 11b. The second shift register 11b can be placed upright relative to the first shift register 11a, so that the second shift register 11b is aligned with the corresponding pixel circuit row 30H.

In some embodiments, as shown in FIG. 9, at least part of the first signal lines 21 is a polyline. At a position of the profiled corner G of the display area AA, some adjacent pixel circuit rows 30H are misaligned in the second direction y to form a step-like edge. At least part of the first signal lines 21 is polyline, so that a line shape of the first signal line 21 can be designed to match the step-edge of the display area AA in the display area AA, and each first signal line 21 is centrally arranged at an edge position of the display area AA, thereby reducing the space of the display area AA occupied by each first signal line 21. Furthermore, a distance between the first signal line 21 and the shift register 11 in the first direction x can be reduced, then a length of the first connection line 31 can be reduced, thereby reducing a voltage drop in the signal line.

As shown in FIG. 9, the first signal line 21 includes a first line segment 21-1 extending along the first direction x and a second line segment 21-2 extending along the second direction y. The first direction x intersects with the second direction y. The first line segment 21-1 and the second line segment 21-2 are connected to each other to form a step-like first signal line 21.

In some embodiments, as shown in FIG. 8, the first signal line 21 in the display area AA is a straight line.

Figure 22:
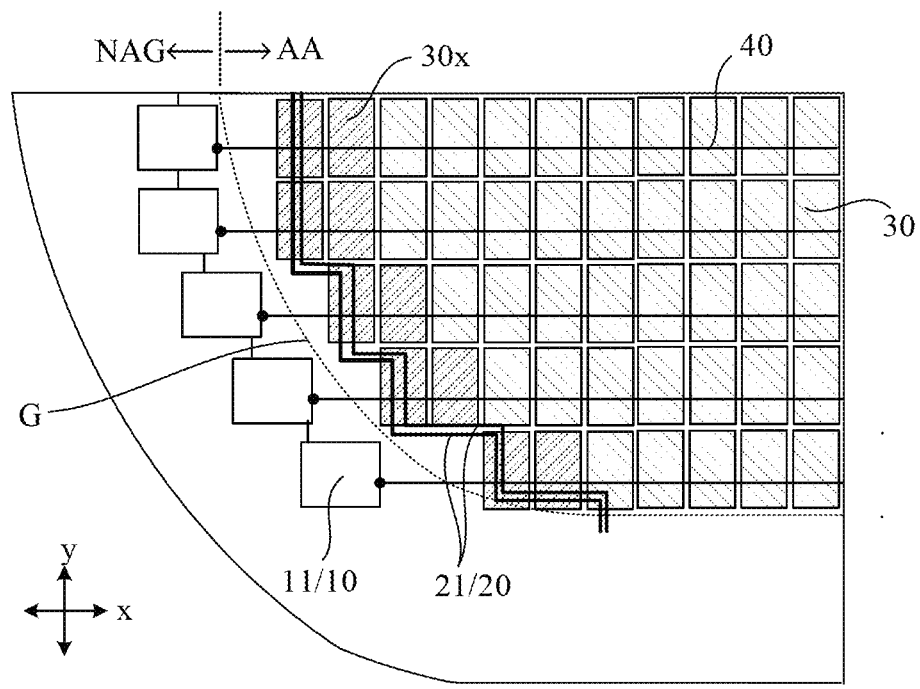
FIG. 22 is a partial schematic diagram of another display panel according to an embodiment of the present disclosure.

FIG. 22 is a partial schematic diagram of another display panel according to an embodiment of the present disclosure. In some embodiments, FIG. 22 schematically illustrates a position of the corner of the display panel. As shown in FIG. 22, the pixel circuit 30 includes a dummy pixel circuit 30x. The dummy pixel circuit 30x is not configured to drive the light-emitting device to emit light. The dummy pixel circuit 30x is located at an edge of the pixel circuit row. The embodiments of the present disclosure do not limit the number of the dummy pixel circuits 30x included in the pixel circuit row. In FIG. 22, only two dummy pixel circuits 30x arranged at an end of the pixel circuit row are shown for illustration. In a direction perpendicular to a plane of the substrate, the first signal line 21 overlaps with the dummy pixel circuit 30x. Therefore, it can avoid that the first signal line 21 overlaps with the pixel circuit 30 for driving the light-emitting device to interfere with a signal of the pixel circuit 30.

In some embodiments, the display panel includes a fixed potential signal line, and in a direction perpendicular to the plane of the substrate, at least partial line segment of the first signal line 21 overlaps with the fixed potential signal line. Such configuration can reduce the coupling caused by the overlapping of the first signal line 21 and the signal line, thereby reducing an influence of the coupling on a signal transmitted on the first signal line 21.

Figure 23:
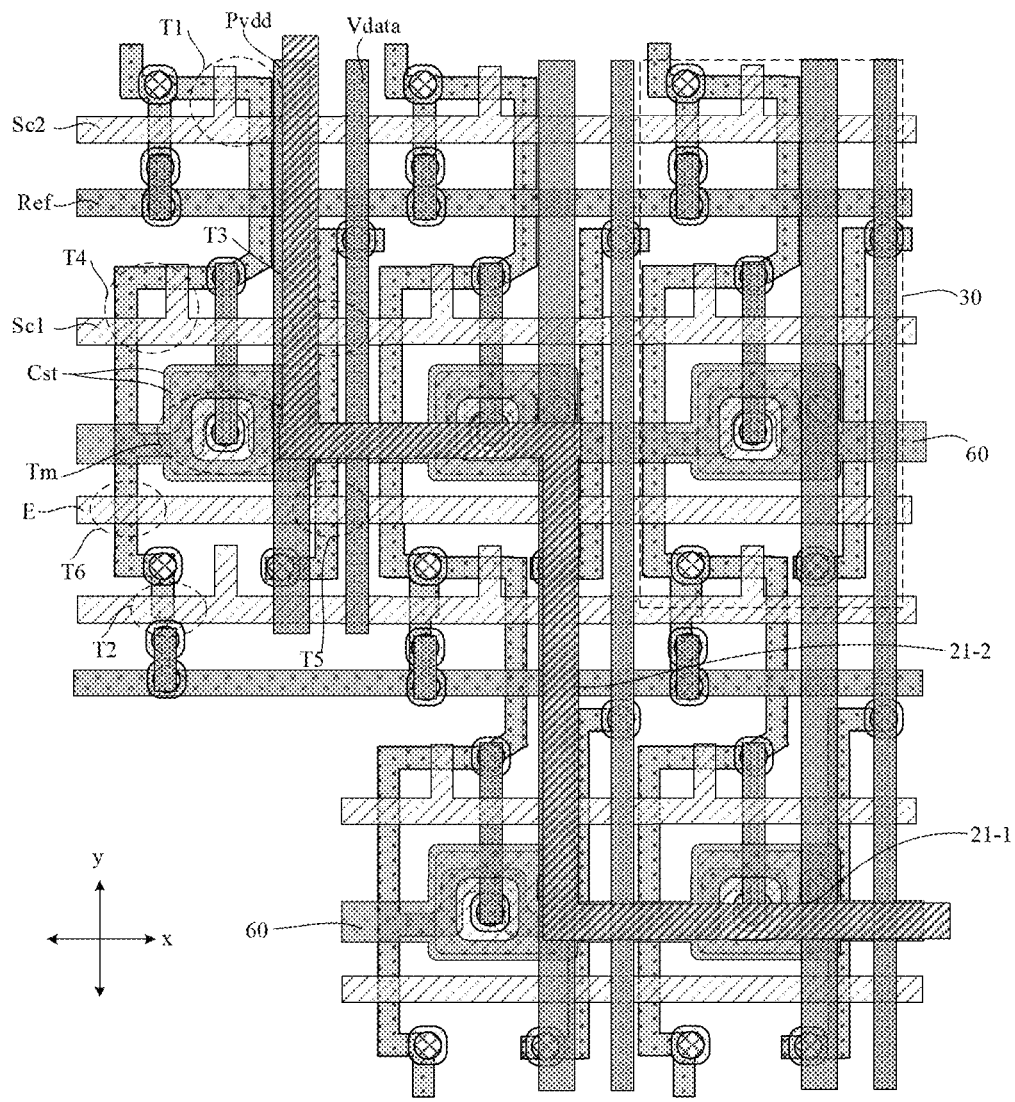
FIG. 23 is a partial schematic diagram of another display panel according to an embodiment of the present disclosure.

FIG. 23 is a partial schematic diagram of another display panel according to an embodiment of the present disclosure. In an embodiment, FIG. 23 shows a circuit diagram at a local position of the display panel, and illustrates that two pixel circuit rows are misaligned by one pixel circuit 30 at an edge position. A pixel circuit structure in FIG. 23 can be understood in conjunction with FIG. 19. As shown in FIG. 23, the display panel includes a reset signal line Ref extending in the first direction x and a positive power supply voltage signal line P$_{vdd}$ extending in the second direction y. The fixed potential signal lines include the reset signal line Ref and the positive power supply voltage signal line P$_{vdd}$. That is, the reset signal line Ref and the positive power supply voltage signal line P$_{vdd}$ each transmit a fixed potential signal. The pixel circuit 30 is coupled to the positive power supply voltage signal line P$_{vdd}$ and the reset signal line Ref, respectively. The second direction y intersects with the first direction x. The pixel circuit 30 includes a storage capacitor C$_{st}$, and a first electrode of the storage capacitor C$_{st}$ is coupled to the positive power supply voltage signal line P$_{vdd}$. The first electrodes in adjacent pixel circuits 30 in the first direction x are connected to each other to form an auxiliary power supply voltage line 60, and the auxiliary power supply voltage line 60 is connected in parallel with the positive power supply voltage signal line P$_{vdd}$, thereby reducing a voltage drop during transmission of the positive power supply voltage signal, and thus improving overall in-plane uniformity. The first signal line 21 includes a first line segment 21-1 extending in the first direction x. FIG. 23 is a schematic top view of the display panel. It can be understood that the top view direction is parallel to the direction perpendicular to the plane of the substrate. As shown in FIG.

23, in the direction perpendicular to the plane of the substrate, the first line segment 21-1 at least partially overlaps with the auxiliary power supply voltage line 60. Such configuration can reduce the coupling caused by the overlapping of the first signal line 21 and the signal line, thereby reducing an influence of the coupling on a signal transmitted on the first signal line 21.

In another embodiment, in the direction perpendicular to the plane of the substrate, the first line segment 21-1 at least partially overlaps with the reset signal line Ref. No drawings are shown herein.

As shown in FIG. 23, the first signal line 21 includes a second line segment 21-2 extending in the second direction y. In a direction perpendicular to the plane of the substrate, the second line segment 21-2 at least partially overlaps with the positive power supply voltage signal line $P_{vdd}$. Such configuration can reduce the coupling caused by the overlapping of the first signal line 21 and the signal line, thereby reducing an influence of the coupling on a signal transmitted on the first signal line 21.

Figure 24:
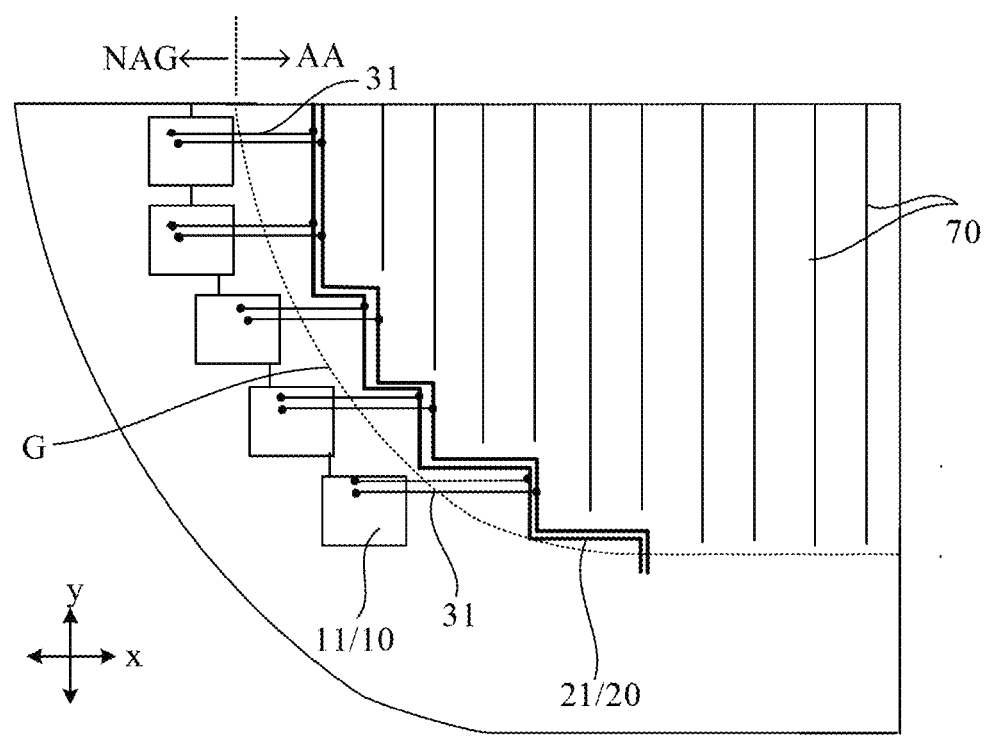
FIG. 24 is a partial schematic diagram of another display panel according to an embodiment of the present disclosure.

FIG. 24 is a partial schematic diagram of another display panel according to an embodiment of the present disclosure. In some embodiments, a corner area of the display panel is schematically shown in FIG. 24. As shown in FIG. 24, the display panel further includes a dummy signal line 70, and the dummy signal line 70 and the first signal line 21 are located in different areas of the display area AA. Only the dummy signal line 70 extending in the second direction y are shown in FIG. 24, but the display panel may further include a dummy signal line 70 extending in the first direction x. Since the first signal line 21 is located in the display area AA, the first signal line 21 may reflect ambient light, resulting in differences in reflectivity at different positions in the display area and thus affecting the display effect. The dummy signal line 70 can balance the difference in pattern density of metal wires at different positions in the display area AA, thereby reducing the difference in reflectivity at different positions in the display area AA, and improving the display effect.

In an embodiment, the dummy signal line 70 and the first signal line 21 are located in a same layer, and the dummy signal line 70 and the first signal line 21 may be formed in a same process, thereby simplifying the process.

In an embodiment of the present disclosure, the dummy signal line 70 transmits a fixed potential signal, therefore, it can prevent the dummy signal line 70 from floating, thereby reducing signal interference.

In an embodiment, the dummy signal line 70 is coupled to the positive power supply voltage signal line $P_{vdd}$, and the dummy signal line 70 transmits a positive power supply voltage signal.

In another embodiment, the dummy signal line 70 is coupled to the reset signal line Ref, and the dummy signal line 70 transmits a reset signal.

In another embodiment, the dummy signal line 70 is coupled to the negative power supply voltage signal line $P_{vdd}$, and the dummy signal line 70 transmits a negative power supply voltage signal.

In an embodiment of the present disclosure, the driving circuit includes a scanning driving circuit and a light-emitting driving circuit. The scanning driving circuit includes a scanning shift register, and the light-emitting driving circuit includes a light-emitting shift register. It can be understood in conjunction with the pixel circuit diagram provided in FIG. 19 that the first scanning line Sc1 and the second scanning line Sc2 are electrically connected to the scanning shift register, and the light-emitting control line E is electrically connected to the light-emitting shift register. That is, the gating line 40 mentioned in the previous embodiments includes the first scanning line Sc1, the second scanning line Sc2, and the light-emitting control line E.

Figure 25:
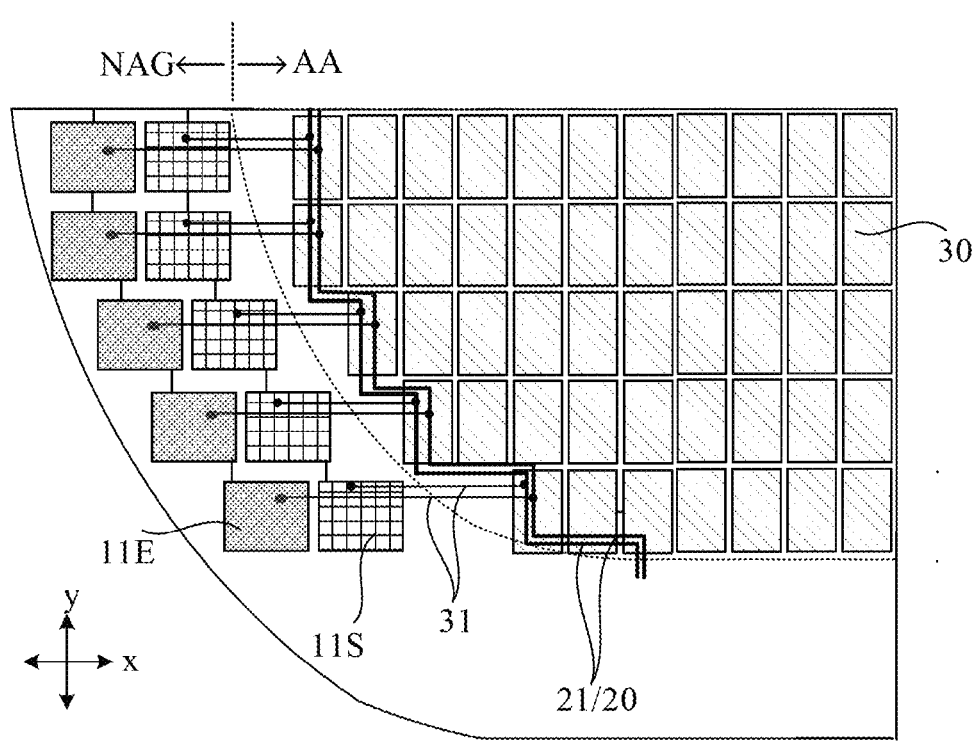
FIG. 25 is a partial schematic diagram of another display panel according to an embodiment of the present disclosure.

FIG. 25 is a partial schematic diagram of another display panel according to an embodiment of the present disclosure. FIG. 25 still illustrates a corner position of the display panel, and the situation at a straight-edge position of the display panel can be understood with reference that. As shown in FIG. 25, in the corner non-display area NAG, the scanning shift register 11S and the light-emitting shift register 11E are located at a same side of the display area AA in the first direction x. The driving signal line 20 coupled to the scanning shift register 11S includes at least one first signal line 21, and the driving signal line 20 coupled to the light-emitting shift register 11E includes at least one first signal line 21. The scanning shift register 11S is coupled to the first signal line 21 through the first connection line 31, and the light-emitting shift register 11E is coupled to the first signal line 21 through the first connection line 31. Such configuration can allow both the light-emitting shift register 11E and scanning shift register 11S to be aligned with the pixel circuit row, therefore, each of the two shift registers does not need to be provided with an oblique line 06 shown as FIG. 1 when it is connected to the corresponding gating line in the display area AA, thereby saving the space of the corner non-display area NAG, reducing a distance between the shift register 11 in the corner non-display area NAG and the display area AA, and reducing the width of the frame in the corner non-display area NAG.

In FIG. 25, the scanning shift register 11S is located at a side of the light-emitting shift register 11E adjacent to the display area AA for illustration. In another embodiment, the scanning shift register 11S may be located at a side of the light-emitting shift register 11E away from the display area AA.

In another embodiment, the scanning shift register 11S and the light-emitting shift register 11E are located at a same side of the display area AA in the first direction x, and the driving signal line coupled to one of the scanning shift register 11S and the light-emitting shift register 11E includes the first signal line 21.

FIG. 25 shows that both the scanning shift register 11S and the light-emitting shift register 11E are provided at the corner position. In some other embodiments, the scanning shift register 11S and the light-emitting shift register 11E are arranged at two sides of the display area AA, for example, the scanning shift register 11S is arranged at a left side of the display area AA and the light-emitting shift register 11E is arranged at a right side of the display area AA. Then, the scanning shift register 11S is arranged at a corner position of a lower left corner of the display panel, and the light-emitting shift register 11E is arranged at a corner position of a lower right corner of the display panel. Moreover, the driving signal line 20 coupled to the scanning shift register 11S includes at least one first signal line 21, and the driving signal line 20 coupled to the light-emitting shift register 11E includes at least one first signal line 21. No drawings are shown herein.

Figure 26:
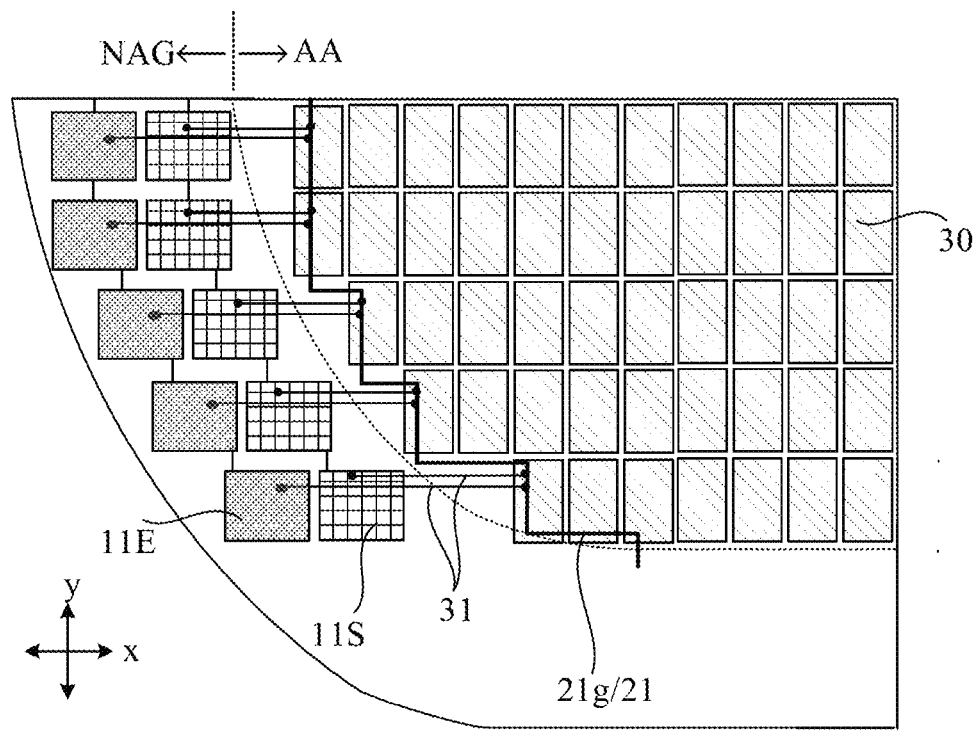
FIG. 26 is a partial schematic diagram of another display panel according to an embodiment of the present disclosure.

FIG. 26 is a partial schematic diagram of another display panel according to an embodiment of the present disclosure. In another embodiment, FIG. 26 still illustrates a corner position of the display panel, and the situation at a straight-edge position of the display panel can be understood with reference to it. As shown in FIG. 26, the first signal line 21 includes a common signal line 21g, and at least one of the scanning shift registers 11S and at least one of the light-emitting shift registers 11E are connected to a same common signal line 21g. The driving signal lines 20 include a power supply signal line. The power supply signal line shown in FIG. 5 or FIG. 6 includes a first power supply signal line VGH and a second power supply signal line VGL. The common signal line 21g includes at least one of the first power supply signal line VGH or the second power supply signal line VGL. In this embodiment, a common signal line 21g is provided in the display area AA, and the common signal line 21g simultaneously drives the scanning shift register 11S and the light-emitting shift register 11E, so that the number of the first signal lines 21 provided in the display area AA can be reduced, thereby reducing the space of the display area AA occupied by the first signal lines 21.

In some embodiments, the common signal line 21g is the widest line among the driving signal lines 20. Since the common signal line 21g simultaneously drives the scanning shift register 11S and the light-emitting shift register 11E, resulting in a relatively large load on the common signal line 21g. In this embodiment, the common signal line 21g has a large width, so that an electric resistance of the common signal line 21g can be reduced, thereby reducing a voltage drop in the common signal line 21g and thus ensuring the driving performance of the common signal line 21g to the shift register.

Figure 27:
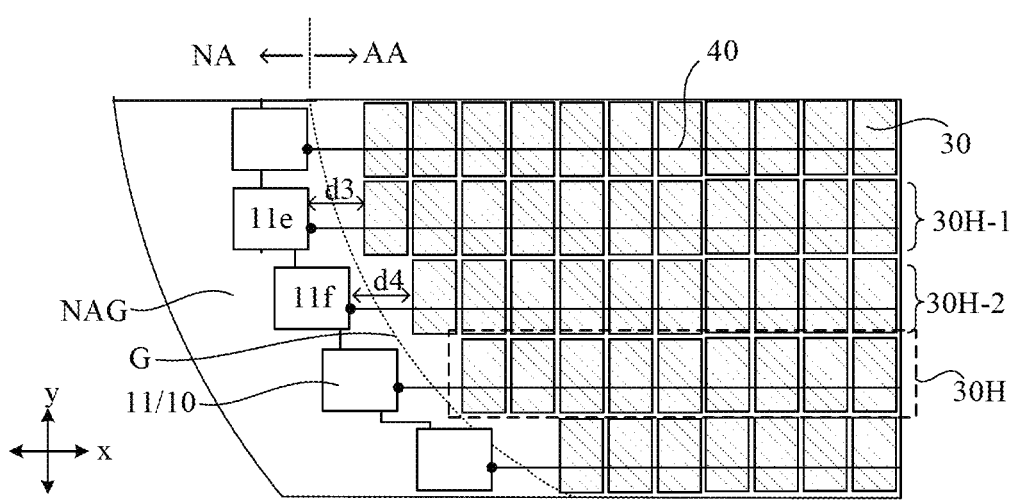
FIG. 27 is a partial schematic diagram of another display panel according to an embodiment of the present disclosure.

Based on a same inventive concept, an embodiment of the present disclosure provides another display panel. FIG. 27 is a partial schematic diagram of another display panel according to an embodiment of the present disclosure. As shown in FIG. 27, the display panel has a display area AA and a non-display area NA. The display panel includes a driving circuit 10 arranged in the non-display area NA and pixel circuits 30 arranged in the display area AA. The pixel circuits 30 are arranged in the first direction x to form a pixel circuit row. The pixel circuit rows include a first pixel circuit row 30H-1 and a second pixel circuit row 30H-2. In the direction y, the first pixel circuit row 30H-1 and the second pixel circuit row 30H-2 are misaligned at a side adjacent to the non-display area NA, and the second direction y intersects with the first direction x. The driving circuit 10 includes shift registers 11 that are cascaded, and the shift registers 11 are correspondingly coupled to the gating lines 40 in the display area AA. The shift registers 11 include a fifth shift register 11e and a sixth shift register 11f. In the first direction x, the fifth shift register 11e is adjacent to the first pixel circuit row 30H-1, and the sixth shift register 11f is adjacent to the second pixel circuit row 30H-2. In the second direction y, the fifth shift register 11e and the sixth shift register 11f are misaligned at a side adjacent to the display area AA.

In this embodiment, for the pixel circuit rows 30H misaligned in the second direction y, the corresponding shift registers 11 adjacent to these pixel circuit rows 30H are also misaligned in the second direction y. Due to the misalignment of the pixel circuit rows 30H, the respective distances between the shift registers 11 and the corresponding adjacent pixel circuit rows 30H has a small difference. Especially when the display area AA has an profiled corner G, the pixel circuit rows 30H are misaligned in the second direction y to form a step-like edge at the position of the profiled corner G. In the embodiments of the present disclosure, the shift registers 11 are misaligned, so that a distance between the shift register 11 and the pixel circuit row 30H in the corner non-display area NAG can be reduced, thereby reducing the width of the frame in the corner non-display area NAG.

In some embodiments, as shown in FIG. 27, in the first direction x, a distance between the fifth shift register 11e and the first pixel circuit row 30H-1 is referred to as a third distance d3, and a distance between the sixth shift register 11f and the second pixel circuit row 30H-2 is referred to as a fourth distance d4, where d3=d4. The distance between the shift register 11 and the pixel circuit row 30H in the first direction x can be illustrated as a distance in the first direction x between an edge of the shift register 11 and an edge of the first pixel circuit in the pixel circuit row 30H. It is provided that d3=d4, then for the pixel circuit rows 30H that are misaligned in the second direction y, the respective distances between the pixel circuit rows 30H and the corresponding shift registers 11 adjacent thereto are equal to each other. Especially at the position of the profiled corner G of the display area AA, the pixel circuit rows 30H are misaligned in the second direction y to form a step-like edge. In the embodiments of the present disclosure, the respective distances between the shift registers 11 in the non-display area NAG and the corresponding pixel circuit rows 30H are equal to each other, so that the width of the frame in the corner non-display area NAG can be reduced.

In the embodiment shown in FIG. 27, the shift registers 11 includes a fifth shift register 11e and a sixth shift register 11f. In some of the previous embodiments, the shift registers 11 includes a first shift register 11a and a second shift register 11b; and in some other embodiments, the shift registers 11 include a third shift register 11c and a fourth shift register 11d. It should be noted that in each embodiment, the sequence number such as "first" and "second", "third" and "fourth", "fifth" and "sixth" is merely for illustrating the technical solutions in the embodiments of the present disclosure, and is not intended to limiting the present disclosure. In the case of no conflict, the technical features in the previous embodiments can be combined. And in the case of no conflict, the sequence numbers of the shift registers in different embodiments can be simply replaced, for example, the fifth shift register 11e and the sixth shift register 11f in the embodiment shown in FIG. 27 can be named as the first shift register 11a and the second shift register 11b, or the fifth shift register 11e and the sixth shift register 11f can be named as the third shift register 11c and the fourth shift register 11d.

Figure 28:
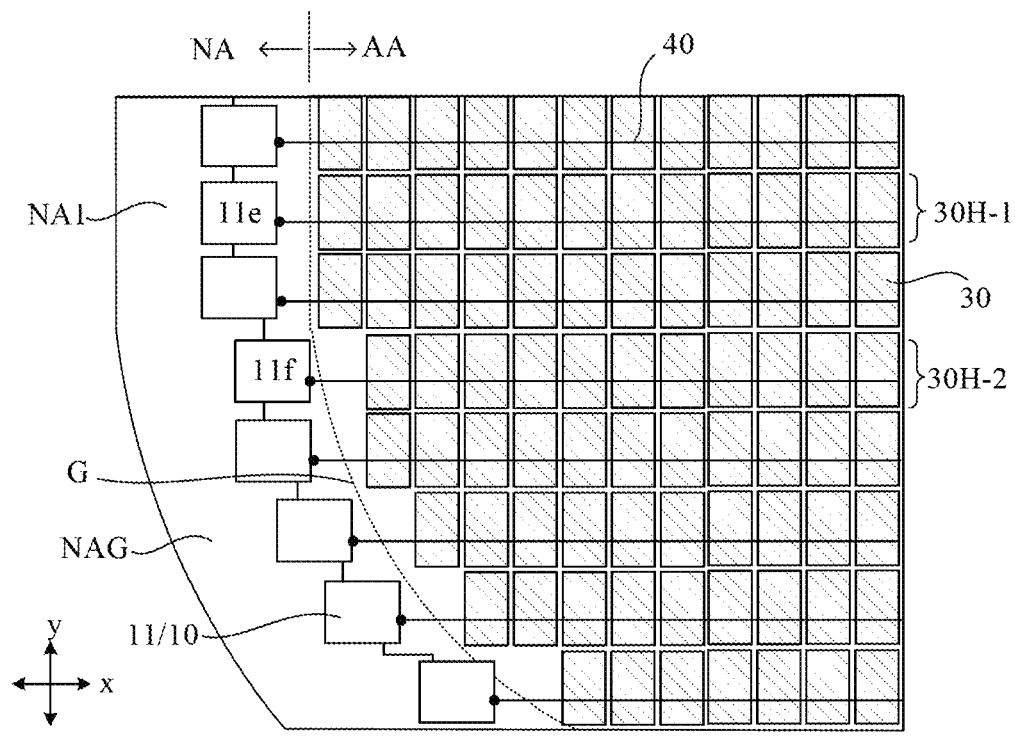
FIG. 28 is a partial schematic diagram of another display panel according to an embodiment of the present disclosure.

FIG. 28 is a partial schematic diagram of another display panel according to an embodiment of the present disclosure. In some embodiments, as shown in FIG. 28, the non-display area NA includes a corner non-display area NAG and a straight-edge non-display area NA1. The fifth shift register 11e is located in the straight-edge non-display area NA1, and the sixth shift registers 11f is located in the corner non-display area NAG. The shift register 11 includes transistors. The shift register 11 may have the structure as shown in FIG. 5 or FIG. 6 described above, or the shift register 11 may have another circuit structure capable of realizing the signal shifting function. In the embodiments of the present disclosure, the channels of the transistors with the same function in the fifth shift register 11e and the sixth shift register 11f extend in a same direction, so that the transistors in the fifth shift register 11e and the sixth shift register 11f can have a same arrangement. Then, the sixth shift register 11f is upright relative to the fifth shift register 11e. With such a configuration, the fifth shift register 11e can be aligned with the corresponding pixel circuit row 30H, so that the connection between the fifth shift register 11e and the corresponding gating line 40 is more convenient, without needing to provide an oblique line in the corner non-display area NAG as shown in FIG. 1. Therefore, the wiring space of the corner non-display area NAG can be saved, and a width of the frame in the corner non-display area NAG can be reduced.

As shown in FIG. 28, the fifth shift register 11e and the sixth shift register 11f are both schematically shown in block diagrams, and it can be seen that an outer contour shape of the fifth shift register 11e is the same as an outer contour shape of the sixth shift register 11f. An edge of the shift register 11 can be illustrated as an outer contour edge of the graphic shape jointly occupied by multiple transistors in the shift register 11. The fifth shift register 11e is located in the straight-edge non-display area NA1, and the sixth shift register 11f is located in the corner non-display area NAG. At a side adjacent to the display area AA, an extending direction of the edge of the fifth shift register 11e is the same as an extending direction of the edge of the sixth shift register 11f. Then, the edge of the sixth shift register 11f adjacent to the display area AA is not configured for adapting the shape of the profiled corner G, that is, the sixth shift register 11f does not need to be obliquely arranged relative to the fifth shift register 11e. With such a configuration, the sixth shift register 11f can be aligned with the corresponding pixel circuit row, so the connection between the sixth shift register 11f and the corresponding gating line is more convenient, without needing to provide an oblique line in the corner non-display area NAG as shown in FIG. 1. Therefore, the wiring space of the corner non-display area NAG can be saved, and a width of the frame in the corner non-display area NAG can be reduced.

When the display panel has a profiled corner G, at least some adjacent shift registers among the shift registers arranged in the corner non-display area NAG adjacent to the profiled corner G will be misaligned. As can be known from the description to the related art shown in FIG. 2 described above, in the related art, the driving signal lines are formed in a same layer, and the driving signal lines are arranged in a same layer. In order to ensure the connection between the shift register and the driving signal line, the shift register and the pixel circuit row in the display area will be misaligned and cannot be aligned. In order to solve the problems in the related art, the embodiments of the present disclosure provide a display panel, in which at least part of the driving signal lines is arranged in different layers, and part of the line segments overlaps with the shift registers, thereby saving the wiring space of the driving signal line, so that the shift register in the corner non-display area can be upright and aligned with the corresponding pixel circuit row.

Figure 29:
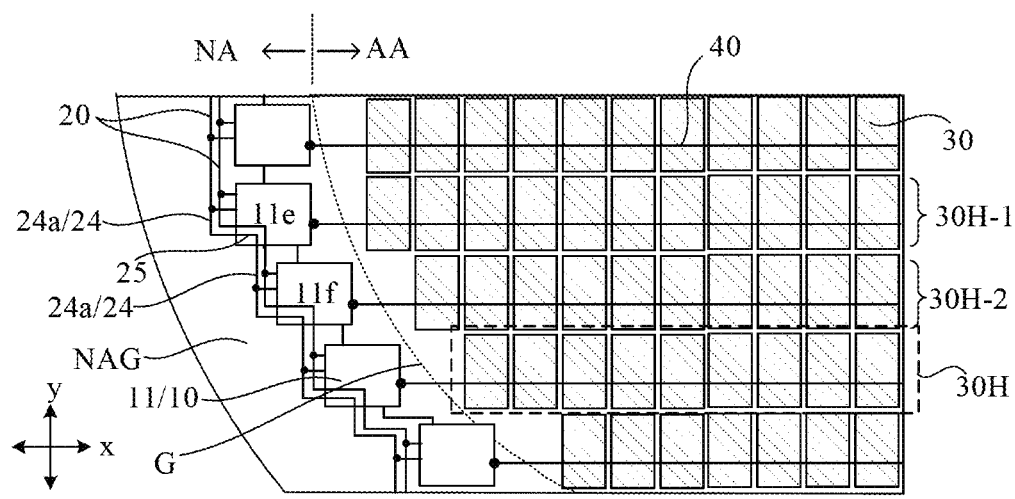
FIG. 29 is a partial schematic diagram of another display panel according to an embodiment of the present disclosure.

FIG. 29 is a partial schematic diagram of another display panel according to an embodiment of the present disclosure. In some embodiments, as shown in FIG. 29, the fifth shift register 11e and the sixth shift register 11f are adjacent to each other in the second direction y, and the display panel further includes driving signal lines 20. The driving signal lines 20 include a start signal line, a clock signal line, and a power supply signal line. Only two driving signal lines 20 are schematically shown in FIG. 29. The driving signal lines 20 are located in the non-display area NA. The driving signal lines 20 include a fourth signal line 24 and a fifth signal line 25 that are located in different layers.

The fourth signal line 24 is located at a side of the shift register 11 in the first direction x. The fourth signal line includes 24 a first signal sub-line 24a and a second signal sub-line 24b. The first signal sub-line 24a is located at a side of the fifth shift register 11e, and the second signal sub-line 24b is located at a side of the sixth shift register 11f. An end of the fifth signal line 25 is connected to the first signal sub-line 24a, and another end of the fifth signal line 25 is connected to the second signal sub-line 24b. The display panel includes a substrate. In a direction perpendicular to the plane of the substrate, the fifth signal line 25 at least partially overlaps with the fifth shift register 11e. In FIG. 29, the fifth signal line 25 is a polyline for illustration, but the embodiments of the present disclosure do not limit the line shape of the fifth signal line 25.

In the display panel, each of the driving signal lines 20 has a certain width, and there needs to be a certain distance between adjacent driving signal lines 20. Moreover, in order to ensure that the performance of each of the shift registers is consistent, the transistor in each shift register has a same size, that is, the space occupied by each shift register is fixed. On this basis, since the fifth shift register 11e and the sixth shift register 11f are misaligned in the second direction y, if the driving signal line 20 is arranged at a side of the shift register 11 according to the configuration in the related art, as illustrated in FIG. 2(2) and FIG. 2(3), in order to arrange the driving signal lines 20 and connect the shift registers 11 and the corresponding driving signal lines 20, the driving signal lines 20 formed in a same layer occupy a large space. As a result, a distance between adjacent shift registers 11 in the second direction y becomes larger, leading to that the shift registers 11 and the corresponding pixel circuit row 30H cannot be aligned with each other.

With the configuration according to the embodiments of the present disclosure, the fifth signal line 25 overlaps with the shift register 11, so that an area occupied by the driving signal line 20 at a position where the shift registers 11 are aligned can be reduced. Moreover, an extending direction of the driving signal line 20 located at a side of the shift register 11 is the same as a direction in which the shift registers 11 are arranged (that is, the second direction y). Therefore, the shift register 11 in the corner non-display area NAG can be arranged upright, which is beneficial to realize the alignment of the shift register 11 in the corner non-display area NAG and the corresponding pixel circuit row 30H, without needing to provide an oblique line in the corner non-display area NAG as shown in FIG. 1. Therefore, the wiring space of the corner non-display area NAG is saved, and the width of the frame in the corner non-display area NAG is reduced.

With reference to FIG. 20, in some embodiments, the fourth signal line 24 is located in the second metal layer 014, and the fifth signal line 25 is located in the third metal layer 015 or the fourth metal layer 016.

In some embodiments, the technical solution of the embodiment shown in FIG. 29 may be combined with the technical solution of the embodiment shown in FIG. 7, so as to reduce the width of the frame in the corner non-display area NAG.

As shown in FIG. 5, the shift register 11 includes an output circuit 111 and a switch circuit 112. The output circuit 111 of the shift register includes an output terminal OUT. The output terminal OUT is coupled to the gating line 40. In the embodiments of the present disclosure, the output circuit 111 is arranged at a side of the switch circuit 112 adjacent to the display area AA, and the fourth signal line 24 is located at a side of the shift register 11 away from the display area AA, so that a length of the connection line between the output terminal OUT of the shift register 11 and the gating line 40 in the display area AA can be reduced, and the connection line between the two does not need to overlap with the driving signal line 20, thereby reducing the parasitic capacitance on the connection line.

It should be noted that, in the drawings related to the embodiments of the present disclosure described above, only a positional relationship and a connection relationship among the device structures in the display panel are illustrated. The adjacent shift registers 11 shown in the drawings have a certain distance in the second direction y, and this is only for clearly illustrating the technical solutions of the embodiments of the present disclosure. In actual products, the shift registers are closely arranged, and the distance between adjacent shift registers is only a minimum process distance (i.e., a minimum distance that can ensure mutual insulation between metal lines).

Figure 30:
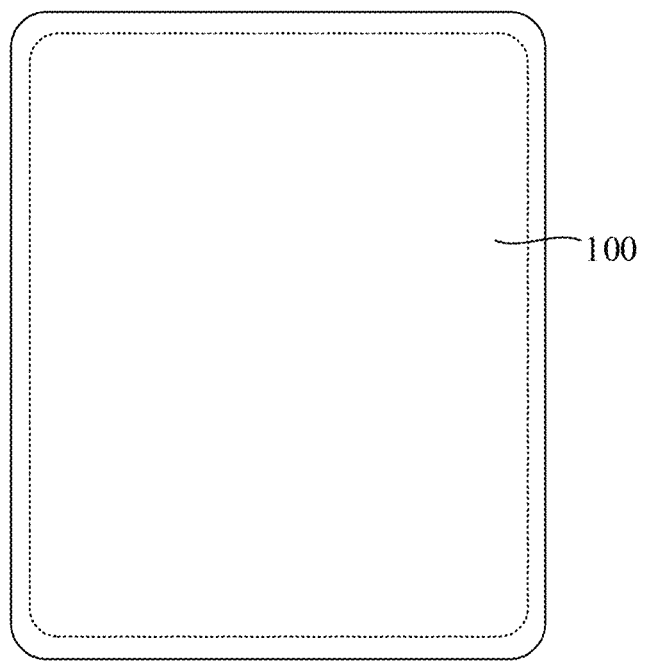
FIG. 30 is a schematic diagram of a display device according to an embodiment of the present disclosure.

Based on a same inventive concept, an embodiment of the present disclosure further provides a display device. FIG. 30 is a schematic diagram of a display device according to an embodiment of the present disclosure. As shown in FIG. 30, the display device includes the display panel 100 provided by any embodiment of the present disclosure. A structure of the display panel has been described in the previous embodiments, and will not be repeated herein. The display device provided by the embodiment of the present disclosure may be an electronic device such as a mobile phone, a computer, a television, a tablet, and a smart wearable device.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, comprising:
a display area; and
a non-display area, and comprising:
a driving circuit arranged in the non-display area, the driving circuit comprising shift registers that are cascaded; and
driving signal lines configured to provide signals to the driving circuit and comprising at least one first signal line located in the display area;
wherein the display panel further comprises a fixed potential signal line and a substrate,
wherein in a direction perpendicular to a plane of the substrate, at least part of line segments of one of the at least one first signal line overlaps with the fixed potential signal line.

2. The display panel according to claim 1, further comprising first connection lines, wherein least one shift register of the shift registers is coupled to one of the at least one first signal line through one of the first connection lines.

3. The display panel according to claim 2, wherein:
the display area has a profiled corner,
the non-display area comprises a corner non-display area adjacent to the profiled corner,
part of the shift registers is located in the corner non-display area; and
at least part of the shift registers in the corner non-display area are coupled to the at least one first signal line through the first connection lines.

4. The display panel according to claim 3, wherein:
the non-display area further comprises a straight-edge non-display area connected to the corner non-display area;
the shift registers comprise a first shift register and a second shift register, the first shift register is located in the straight-edge non-display area, and the second shift register is located in the corner non-display area;
wherein the first shift register and the second shift register comprise transistors; and
wherein channels of the transistors with a same function in the first shift register and the second shift register extend in a same direction; or
wherein the non-display area further comprises a straight-edge non-display area connected to the corner non-display area;
wherein the shift registers comprise a first shift register and a second shift register, the first shift register is located in the straight-edge non-display area, and the second shift register is located in the corner non-display area; and
wherein at a side adjacent to the display area, an extending direction of an edge of the first shift register is a same direction as an extending direction of an edge of the second shift register.

5. The display panel according to claim 3, further comprising pixel circuits, wherein the pixel circuits are arranged to form pixel circuit rows, and one pixel circuit row of the pixel circuit rows comprises the pixel circuits arranged in a first direction; and
wherein in the first direction, at least one shift register of the shift registers in the corner non-display area is aligned with a corresponding one pixel circuit row of the pixel circuit rows.

6. The display panel according to claim 3,
wherein the corner non-display area is provided with at least one driving signal line segment extending along a second direction, the at least one driving signal line segment connected to the at least one first signal line through the first connection lines;
wherein in the corner non-display area, at least two shift registers adjacent in the second direction and aligned with each other are coupled to the at least one driving signal line segment; and
wherein the at least one driving signal line segment is located at a side of the shift registers away from the display area, or located at a side of the shift registers adjacent to the display area.

7. The display panel according to claim 2,
wherein the non-display area comprises a straight-edge non-display area, and a part of the shift registers is located in the straight-edge non-display area; and
wherein at least the part of the shift registers in the straight-edge non-display area is coupled to corresponding first signal lines through the first connection lines.

8. The display panel according to claim 2,
wherein the shift registers comprise a third shift register and a fourth shift register, and the third shift register is coupled to one of the at least one first signal line through one of the first connection lines; and
the non-display area is provided with at least one second connection line, and the fourth shift register is coupled to one of the first connection lines through one of the at least one second connection line; and
wherein the third shift register is aligned with the fourth shift register in a second direction, and the second direction is a direction in which the third shift register and the fourth shift register are arranged; or wherein the third shift register and the fourth shift register are misaligned in a second direction, and the second direction is a direction in which the third shift register and the fourth shift register are arranged.

9. The display panel according to claim 1,
wherein the display area has a profiled corner, the non-display area comprises a corner non-display area and a straight-edge non-display area, the corner non-display area is adjacent to the profiled corner, the straight-edge non-display area is connected to the corner non-display area, part of the shift registers is located in the straight-edge non-display area, and another part of the shift registers is located in the corner non-display area; and
wherein the driving signal lines comprise a third signal line extending in the corner non-display area and extending from the corner non-display area to the straight-edge non-display area.

10. The display panel according to claim 1, further comprising pixel circuits located in the display area and a substrate,
wherein the pixel circuits comprise at least one dummy pixel circuit; and
wherein in a direction perpendicular to a plane of the substrate, the at least one first signal line overlaps with the at least one dummy pixel circuit.

11. The display panel according to claim 1, further comprising:
pixel circuits;
a reset signal line extending in a first direction; and
a power supply voltage signal line extending in a second direction,
wherein the pixel circuits are coupled to the power supply voltage signal line and the reset signal line, and the second direction intersects with the first direction;
wherein one of the pixel circuits comprises a storage capacitor, a first electrode of the storage capacitor is coupled to the power supply voltage signal line, and the first electrodes of the pixel circuits adjacent in the first direction are connected to each other to form an auxiliary power supply voltage line; and
wherein one of the at least one first signal line comprises a first line segment extending in the first direction; and
wherein in the direction perpendicular to the plane of the substrate, the first line segment at least partially overlaps with the auxiliary power supply voltage line, or the first line segment at least partially overlaps with the reset signal line; or
the display panel further comprises:
pixel circuits; and
a power supply voltage signal line extending in a second direction,
wherein the pixel circuits are coupled to the power supply voltage signal line;
wherein the at least one first signal line comprises a second line segment extending in the second direction; and
wherein in the direction perpendicular to the plane of the substrate, the second line segment at least partially overlaps with the power supply voltage signal line.

12. The display panel according to claim 1, further comprising dummy signal lines, wherein the dummy signal lines and the at least one first signal line are located in different areas of the display area; and
wherein at least one of the dummy signal lines transmits a fixed potential signal.

13. The display panel according to claim 1,
wherein the driving circuit comprises a scanning driving circuit and a light-emitting driving circuit, the scanning driving circuit comprises at least one scanning shift register, and the light-emitting driving circuit comprises at least one light-emitting shift register;
wherein the at least one scanning shift register and the at least one light-emitting shift register are located at a same side of the display area in a first direction; and
wherein the driving signal lines, to which at least one of the at least one scanning shift register or the at least one light-emitting shift register is coupled, comprise the at least one first signal line.

14. The display panel according to claim 13,
wherein the at least one first signal line comprises a common signal line, at least part of the at least one scanning shift register and at least part of the at least one light-emitting shift register are connected to a same common signal line; and
wherein the driving signal lines comprise a power supply signal lines, the power supply signal lines comprise a first power supply signal line and a second power supply signal line, the common signal line comprises at least one of the first power supply signal line or the second power supply signal line.

15. A display panel, comprising:
a non-display area;
a display area;
a driving circuit located in a non-display area; and
pixel circuits located in a display area;
wherein the pixel circuits are arranged to form pixel circuit rows, one pixel circuit row of the pixel circuit rows comprises multiple pixel circuits arranged in a first direction; the pixel circuit rows comprise a first pixel circuit row and a second pixel circuit row; in a second direction, the first pixel circuit row and the second pixel circuit row are misaligned at an end adjacent to the non-display area; and the second direction intersects with the first direction;
wherein the driving circuit comprises shift registers that are cascaded, and the shift registers comprise a fifth shift register and a sixth shift register; and
wherein in the first direction, the fifth shift register is adjacent to the first pixel circuit row, and the sixth shift register is adjacent to the second pixel circuit row; and in the second direction, the fifth shift register and the sixth shift register are misaligned at an end adjacent to the display area;
wherein the display further comprises driving signal lines located in the non-display area, and a substrate,
wherein the fifth shift register and the sixth shift register are adjacent in the second direction;
wherein the driving signal lines comprise a fourth signal line and a fifth signal line, and the fourth signal line and the fifth signal line are located in different layers;
wherein the fourth signal line is located at a side of the shift registers in the first direction, the fourth signal line comprises a first signal sub-line and a second signal sub-line, the first signal sub-line is located at a side of the fifth shift register, and the second signal sub-line is located at a side of the sixth shift register;
wherein an end of the fifth signal line is connected to the first signal sub-line, and another end of the fifth signal line is connected to the second signal sub-line; and
wherein in a direction perpendicular to a plane of the substrate, the fifth signal line at least partially overlaps with the fifth shift register.

16. The display panel according to claim 15,
wherein the non-display area comprises a corner non-display area and a straight-edge non-display area;
wherein the fifth shift register is located in the straight-edge non-display area, and the sixth shift register is located in the corner non-display area; and the fifth shift register and the sixth shift register comprise transistors; and
wherein channels of the transistors with a same function in the fifth shift register and the sixth shift register extend in a same direction or
wherein the non-display area comprises a corner non-display area and a straight-edge non-display area;
wherein the fifth shift register is located in the straight-edge non-display area, and the sixth shift register is located in the corner non-display area; and
wherein at a side adjacent to the display area, an extending direction of an edge of the fifth shift register is the same as an extending direction of an edge of the sixth shift register.

17. The display panel according to claim 15, wherein in the first direction, a distance between the fifth shift register and the first pixel circuit row is equal to a distance between the sixth shift register and the second pixel circuit row.

18. A display device, comprising:
a display panel comprising:
a display area;
a non-display area;
a driving circuit arranged in the non-display area and comprising shift registers that are cascaded; and
driving signal lines configured to provide signals to the driving circuit and comprising at least one first signal line located in the display area;
wherein the display panel further comprises a fixed potential signal line and a substrate,
wherein in a direction perpendicular to a plane of the substrate, at least part of line segments of one of the at least one first signal line overlaps with the fixed potential signal line.

* * * * *